United States Patent
Damola et al.

(10) Patent No.: US 8,971,872 B2
(45) Date of Patent: Mar. 3, 2015

(54) METHOD FOR PERFORMING AND A DEVICE FOR PROVIDING A M2ME FAIL OVER MECHANISM

(75) Inventors: Ayodele Damola, Solna (SE); Johan Hjelm, Tokyo (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 57 days.

(21) Appl. No.: 13/878,775

(22) PCT Filed: Oct. 15, 2010

(86) PCT No.: PCT/SE2010/051112
§ 371 (c)(1),
(2), (4) Date: Apr. 11, 2013

(87) PCT Pub. No.: WO2012/050496
PCT Pub. Date: Apr. 19, 2012

(65) Prior Publication Data
US 2013/0189974 A1    Jul. 25, 2013

(51) Int. Cl.
*H04W 24/04*    (2009.01)
*H04B 1/74*    (2006.01)
*H04W 4/00*    (2009.01)
*H04W 84/04*    (2009.01)

(52) U.S. Cl.
CPC ............... *H04W 24/04* (2013.01); *H04B 1/74* (2013.01); *H04W 4/005* (2013.01); *H04W 84/045* (2013.01)
USPC .......................................... 455/423; 455/411

(58) Field of Classification Search
CPC ... H04W 84/045; H04W 12/06; H04W 80/04; H04W 24/10; H04W 24/04
USPC ................... 455/411, 423, 434; 370/328, 329
See application file for complete search history.

(56) References Cited

U.S. PATENT DOCUMENTS

| | | | |
|---|---|---|---|
| 2002/0151302 A1 | 10/2002 | Schmidt et al. | |
| 2005/0221834 A1 | 10/2005 | Kangas et al. | |
| 2009/0117876 A1* | 5/2009 | Inoue | 455/411 |

FOREIGN PATENT DOCUMENTS

| | | |
|---|---|---|
| CN | 101461187 (A) | 6/2009 |
| CN | 101730279 | 6/2010 |
| WO | WO 2007/147451 | 12/2007 |

OTHER PUBLICATIONS

International Search Report, PCT Application No. PCT/SE2010/051112, Date of Mailing: May 12, 2011, 4 pp.

(Continued)

*Primary Examiner* — Sam Bhattacharya
(74) *Attorney, Agent, or Firm* — Myers Bigel Sibley & Sajovec, P.A.

(57) ABSTRACT

An alternative access point for M2ME's is provided by introducing an extended M2ME, a M2ME/Femto, which is able to operate as a Femto cell in addition to operating as an M2ME is provided. The M2ME/Femto is configured to recognize a connectivity disruption in a conventional wireless connection to a home operator and to respond to such a disruption by providing for an alternative, fixed connection between the M2ME/Femto and the home operator. A M2ME configured to access the M2ME/Femto when required due to a connectivity disruption and a node of a home operator configured to set up an alternative fixed connection between the M2ME/Femto and the node when required due to a connectivity disruption at the wireless connection is also provided.

36 Claims, 14 Drawing Sheets

(56) References Cited

OTHER PUBLICATIONS

3GPP TR 33.812 V9.2.0 (Jun. 2010); Technical Report; $3^{rd}$ Generation Partnership Project; Technical Specification Group Services and System Aspects; Feasibility study on the security aspects of remote provisioning and change of subscription for Machine to Machine (M2M) equipment (Release 9); [retrieved from the internet May 9, 2011, URL: http://www.3gpp.org/ftp/Specs/archive/33_series/33.812/33812-920.zip].

3GPP TSG RAN WG3#55; R3-070297; St Louis, US, Feb. 12-16, 2007; Source: Orange, Telecom Italia, T-Mobile, Vodafone; Title: Requirements for the Home eNodeB Deployment; [retrieved from the internet May 9, 2011, URL: http://www.3gpp.org/ftp/tsg_ran/WG3_lu/TSGR3_55/docs/R3-070297.zip].

Chinese Office Action (8 pages) corresponding to Chinese Patent Application No. 201080070741.7; Issue Date: Jun. 18, 2014.

3GPP TR 33.812 V9.1.0 (Apr. 2010); Technical Report; $3^{rd}$ Generation Partnership Project; Technical Specification Group Services and System Aspects; Feasibility study on the security aspects of remote provisioning and change of subscription for Machine to Machine (M2M) equipment (Release 9); 87 pages.

Broadband Forum Technical Report, TR-069, CPE WAN Management Protocol v1.1, Version:Issue 1 Amendment 2, Version Date: Dec. 2007, 138 pages.

3GPP TR 22.868 V8.0.0 (Mar. 2007); Technical Report; $3^{rd}$ Generation Partnership Project; Technical Specification Group Services and System Aspects; Study on Facilitating Machine to Machine Communication in 3GPP Systems; (Release 8); 15 pages.

* cited by examiner

METHOD FOR PERFORMING AND A DEVICE FOR PROVIDING A M2ME FAIL OVER MECHANISM

CROSS REFERENCE TO RELATED APPLICATION

This application is a 35 U.S.C. §371 national stage application of PCT International Application No. PCT/SE2010/051112, filed on 15 Oct. 2010, the disclosure and content of which is incorporated by reference herein in its entirety. The above-referenced PCT International Application was published in the English language as International Publication No. WO 2012/050496 A1 on 19 Apr. 2012.

TECHNICAL FIELD

The present document relates to a method for providing an alternative to a failing connectivity between an M2ME and a home operator, a device which provides such an option and a device which can make use of such an option.

BACKGROUND

Machine to Machine (M2M) communication is a form of data communication applicable in a wide variety of areas which can be applied and managed between certain M2M Equipments (M2ME's) without requiring any human interaction.

FIG. 1 is illustrating a typical 3G network architecture which enables M2MEs, here represented by M2ME 100, to connect to and communicate with a home operator (HO), which typically may be referred to as a Selected Home Operator (SHO) in case alternative home operators are accessible, offering one or more services to the M2ME. Typically a plurality of M2MEs located within the same geographical area using the same, or similar, services are connected to the same HO, and may be considered as a dedicated group of M2MEs.

As indicated in FIG. 1, an M2ME 100 may connect to an HO 103 by first connecting to an access point which provides wireless connectivity between the M2ME 100 and the HO 103. In FIG. 1 a Virtual Network Operator or Visiting Network operator (VNO) 101 provides wireless access to M2MEs via a wireless network, such as e.g. a 3G or a 4G network. Once the M2ME 100 has established wireless access to HO 103, conventional registration procedures may be executed by the M2ME 100, interacting with a Registration Operator (RO) 102 and a Platform Validation Authority (PVA) 104. Although not shown in FIG. 1, RO 102 typically comprises a Discovery and Registration Function (DRF), an Initial Connectivity Function (IFC) and a Downloading and Provisioning Function (DPF) which, together with the PVA 104, are used for executing a registration of the M2M2. Alternatively the DPF may reside at the HO 103 instead of in the RO 102.

More details on how to provide 3G connectivity for M2MEs can be studied in 3GPP TR 33.812 "Feasibility Study on the Security Aspects of Remote Provisioning and Change of Subscription for M2M Equipment".

The M2MEs referred to in this document may be configured as fully self contained devices or devices with interfaces, which enables a respective M2ME to attach to external devices, such as e.g. sensors and/or on-site service equipments.

Irrespective of the applied network configuration, practically any M2ME scenario will assume connectivity between the VNO and the M2MEs that is always kept present, since without cellular connectivity, this type of applications will in general not be able to operate reliably. In practice, however, constant connectivity cannot be guaranteed in presently available M2ME applications.

A Universal Integrated Circuit Card (UICC) is a smart card used in mobile User Equipments (UEs) adapted for wireless network access to the HO 103. The UICC ensures the integrity and security of all kinds of personal data handled by the UEs. For UMTS a Universal Subscriber Identity Module (USIM) is typically running on the UICC. With the UMTS release 5 a new application, the IP multimedia Services Identity Module (ISIM), is instead required if services in the IP-Multimedia Subsystem (IMS) are to be applied on the mobile terminal.

As for mobile terminals providing M2ME functionality, the USIM or ISIM application may reside either within the UICC, or as a separate entity within the M2ME. In the former case the UICC may be either physically integrated with the M2ME, or it may be implemented as a removable UICC, where the UICC is configured to carry the USIM/ISIM, while in the latter case the USIM/ISIM application may be integrated and embedded within the M2ME in a protected module, but without a physical UICC.

The Machine Communications Identity Module (MCIM) application is a USIM/ISIM application which is applicable at an M2ME and which can reside either in a UICC within the M2ME, or in the M2ME without a physical UICC once it has been allocated from the HO to the M2ME, e.g. by way of pushing the MCIM to the M2ME.

Once an M2ME is in possession of an MCIM, a subscription can be managed by the home operator, thereby allowing the M2ME to establish communication with the home operator.

Changing subscription can be a costly process since it may involve costly physical maintenance work on the M2MEs in the field, especially for the scenario involving a large number of M2MEs. Changing of a subscription also require a non-trivial procedure as the UICC and/or MCIM needs to be carefully protected against tampering and stealing, since M2MEs are typically left unattended.

There are a great number of interesting application areas and usage scenarios available for M2ME 3G and 4G communication. In one scenario traffic cameras suitable for making use of cellular connectivity via respective M2ME functionality may be installed in locations, such as e.g. motorway overpasses, remote stretches of roadway, or other traffic constructions, which require traffic monitoring.

Cameras may also require simultaneous secure local WLAN connectivity, such that one camera can communicate with the next camera placed further down the road, e.g. for the purpose of measuring average speed of vehicles passing by the camera arrangement. It will be necessary to securely provision these cameras with subscription credentials. When cameras are deployed over a large area, it may also be necessary to be able to select a carrier for a given camera after it has been deployed, where also such a selection process must be properly secured. In addition, secure post-deployment changes in subscription data will be needed.

In another scenario, referring to the use of M2MEs for a remote metering application, a change of utility by a residential customer may also require a change of operator. The utility itself may switch operators, requiring a change to many meters dispersed over a large geographical area in a limited time frame. The management of these changes may also require very complex accounting mechanisms. Without the ability to remotely change subscription, a service person may need to visit each affected device. For commercial applications, obtaining physical access to deployed devices may be expensive, e.g. because of geography, extreme environmental conditions, and/or due to the need to interrupt a manufacturing process, such as e.g. a petrochemical refining process. Therefore, remote means to enable change of subscription would be desired.

In yet another scenario, M2MEs may be user together with vending machines. Vending machines are however subject to regular attacks on their contents, which increase the threat also to other items of value being contained in the machine. Normally, vending machine connectivity may come from a Home Node B or from 3GPP I-WLAN access within the M2M subscriber premises.

As indicated in the different scenarios mentioned above, M2MEs are proposed to be used in various types of mission critical deployments, where a failure of the wireless network access could have severe and, in some situations, such as e.g. traffic surveillance, even potentially fatal consequences.

A more reliable solution to a potential wireless disruption scenario where the conventional way of communicating applied by at least two M2MEs is standing the risk of being inoperable is therefore a requirement for the exemplifying scenarios mentioned above, as well as for many other potential M2ME applications.

SUMMARY

An object of the present document is to address at least some of the problems mentioned above. More specifically an object of the present document is to enable for M2ME's to maintain connection with a home operator also after a connectivity disruption of its ordinary wireless connection with the home operator has occurred.

An alternative access point is provided by introducing an extended M2ME, in this document referred to as a M2ME/Femto, which is able to operate as a Femto cell in addition to operating as an M2ME. A modified M2ME configured to access a M2ME/Femto when required due to a connectivity disruption of a wireless connection and a node of a home operator configured to set up an alternative fixed connection between the M2ME/Femto and the node is also provided.

According to a first aspect, a M2ME/Femto, in the present summary referred to as a first M2ME, is provided. The first M2ME comprises a processor operable to execute a first process which is capable of establishing wireless connection with a home operator via a first wireless access point.

The processor is further operable to execute a second process capable of realizing a virtualized Femto cell operable as an alternative wireless access point for a M2ME, operable as a conventional M2ME, in the summary referred to as a second M2ME, and that the first process comprises a link state monitor capable of monitoring the wireless connectivity of the first process, and capable of initiating the second process and of initiating a fixed connection between the Femto cell and the home network in case of monitoring a wireless connectivity disruption for the first process.

The proposed M2ME/Femto, i.e. the first M2ME, is thus capable of automatically initiating a Femto cell and setting up an alternative fixed connection, which can be used for communication between the Femto cell and the home operator, in response to recognizing that a wireless connection normally used by M2ME's is being exposed to a connectivity disruption.

By introducing a first M2ME, a conventional M2ME, i.e. a second M2ME, located in the vicinity of the first M2ME will be able to automatically access the Femto cell of the first M2ME and resume communication with the home operator.

Two advantages with using a virtualized Femto cell approach are that resource conservation can be obtained and that required costs can be reduced, compared to applying a conventional Femto cell configuration. When applying a virtualized Femto cell, the hardware resources are conserved because the same computing hardware hosts both the M2ME and the Femto. Power is another resource that gets conserved when virtualization is applied, since only a single hardware unit needs to be powered rather than two. From a cost perspective, the solution owner invests in a single hardware unit rather than two as would have been the case with a standalone Femto and a standalone M2ME.

During the fixed connection initiation the first process is typically configured to authenticate towards the home operator, by providing contact information about the Femto cell to the home operator, thereby informing the home operator that the first M2ME is able to also operate as a Femto cell.

Typically, the first process is configured to provide the contact information to the home operator in a first MCIM and to install into the first M2ME a second MCIM dedicated for the second process and provided from the home operator.

In addition to initiating a virtualized Femto cell, the first process may also be configured to realize a virtualized M2ME, thereby enabling for a more flexible configuration of the M2ME/Femto. According to one embodiment, the first M2ME may be provided with a hypervisor (402) capable of running a first operating system (OS 1) in said first process (500*a*,500*b*,500*c*) and a second operating system (OS 2) in said second process (501*a*,501*b*,501*c*).

According to a second embodiment the first M2ME, may, instead of having a hypervisor, comprise a first operating system (Host OS), capable of running in the first process, where the first operating system is capable of acting as a host operating system to a second operating system (Guest OS) capable of running in the second process.

According to two possible embodiments, the first process may be configured to initiate the fixed connection via any of a fixed interface or a dial up interface.

In addition to being able to initiate the second process of the first M2ME, the link state monitor may also be configured such that it is capable of triggering a termination of the second process if the wireless connectivity is once again acceptable. More specifically, the link state monitor may be configured to terminate the second process in case of monitoring a wireless connectivity via the first wireless access point which satisfies at least one predefined condition, which may e.g. be defined as a certain quality measure.

According to another aspect, a second M2ME, being configured to execute conventional M2ME functionality is provided. In order to be able to access a home network both via a VNO and via a Femto cell of the first M2ME, the second M2ME is configured such that it is capable of connecting to the home network via a first interface (interface 1) and a first wireless access point (VNO), and of connecting, via a second interface to the home network via a first machine to machine equipment according to any of claims 1-9.

According to yet another aspect, a method performed by a first M2ME is provided. The suggested method is executing a first process which has established a wireless connection with a home operator via a first wireless access point where the connectivity provided by the first wireless access point is being monitored, and upon recognizing a wireless connectivity disruption during the monitoring an establishment of a fixed connection with the home network is initiated.

In addition, a second process realizing a virtualized Femto cell, where the virtualized Femto cell is operable as an alternative wireless access point to a second M2ME, is initiated.

The establishing of the fixed connection typically comprises an execution of an authenticating towards the home operator, which may be achieved by providing contact information about the Femto cell to the home operator. Typically, the contact information is provided to the home operator in a first machine communications identity module (MCIM), followed by a reception from the home operator of a second MCIM dedicated for the Femto cell and an installation of the MCIM dedicated for the Femto cell on the first M2ME.

The fixed connection may typically be executed via any of a fixed interface or a dial-up interface.

The second process may be initiated by generating by the link state monitor a Femto cell initiation instruction, and by instructing a hypervisor to initiate a Femto cell according to the instruction.

In order to enable the first M2ME to resume connection with the wireless access point, the method may also comprise the further step of the link state monitor generating a Femto cell termination instruction, instructing the hypervisor to terminate the Femto cell in case of recognizing during the monitoring a wireless connectivity provided via the first wireless access point which is satisfying at least one predefined condition.

In case the first M2ME comprises no hypervisor, a corresponding procedure of initiating, and optionally also of terminating a second process may instead be executed by a guest operating system being instructed to execute the required step.

According to another aspect, a network node of a home operator is provided. The network is provided with a unit, here referred to as a connectivity unit, which is configured to establish a wireless connection between a first M2ME and the home operator. In addition the suggested connectivity unit is configured to instruct the first M2ME to initiate a process realizing a Femto cell and to set up a fixed connection between the network node and the first M2ME, such that a second M2ME can connect to the home operator via the Femto cell and the fixed connection.

More specifically, the connectivity unit may be configured to instruct the first M2ME to initiate the process in response to receiving a connection set-up request from the first M2ME via a channel, other than the channel used for establishing the wireless connection. By considering a change of channel it can easily be determined that a switch from one connection option to an alternative connection option is required by the first M2ME.

In addition, or as an alternative to considering a change of channel, the connectivity unit may be configured such that it is capable of recognizing a connectivity disruption of the wireless connection and to request the first M2ME to initiate a Femto process in case of recognizing such a connectivity disruption.

Furthermore, the connectivity unit may also be capable of recognizing that a group of M2ME's, comprising the first M2ME, is exposed to a connectivity disruption, and configured to respond to the connection set-up request by transmitting the instruction to the first M2ME in response to recognizing such a connectivity disruption. Such an approach may alternatively be applied in combination with the channel change approach mentioned above.

The connectivity unit is typically configured to request the first M2ME to initiate a Femto process, which when executed on the first M2ME is capable of providing a second M2ME access to the home operator via the fixed connection, in response to receiving the set-up request from the first M2ME.

According to yet another aspect a method performed by a network node of a home operator is provided. The method is performed at a node which has established a wireless connection between a first M2ME and the home operator. The first M2ME is instructed to initiate a process realizing a Femto cell and to set up a fixed connection between the first M2ME and the network node, thereby enabling a second M2ME to connect to the home operator via the Femto cell and the fixed connection.

The instruction may be provided to the first M2ME in response to receiving a connection set-up request from the first M2ME via a channel, other than the channel used for establishing the wireless connection.

Alternatively, or in addition to the channel change alternative mentioned above, the instruction for the first M2ME to initiate a Femto process may be transmitted in case of recognizing a connectivity disruption for the wireless connection.

A further alternative trigger, to respond to the connection set-up request, which may be applied alone or in combination with the channel change alternative, may be based on the recognition that a group of M2ME's, including the second M2ME, is exposed to a connectivity disruption.

BRIEF DESCRIPTION OF THE DRAWINGS

The present invention will now be described in more detail with reference to the accompanying drawings, in which.

DETAILED DESCRIPTION

While the present document covers various alternative embodiments of the methods and arrangements as described below with reference to the disclosed figures, it is to be understood that the specific description and figures are not intended to limit the scope of the invention to the specific forms disclosed. On the contrary, the scope of the claimed invention is to be seen as including all modifications and alternative constructions thereof falling within the spirit and scope of the invention as expressed in the appended claims.

While this document refers to a Femto cell which is operable as an alternative access point for a M2ME, it is to be understood that also other types of low power wireless access points which are configured to provide corresponding wireless access possibilities to various types of devices may be applied.

In addition, while the given examples refer to 3G communication networks it is to be understood that the switch over mechanism described in this document may also be applied in other communication networks which enables corresponding alternative network access options.

Figure 1:
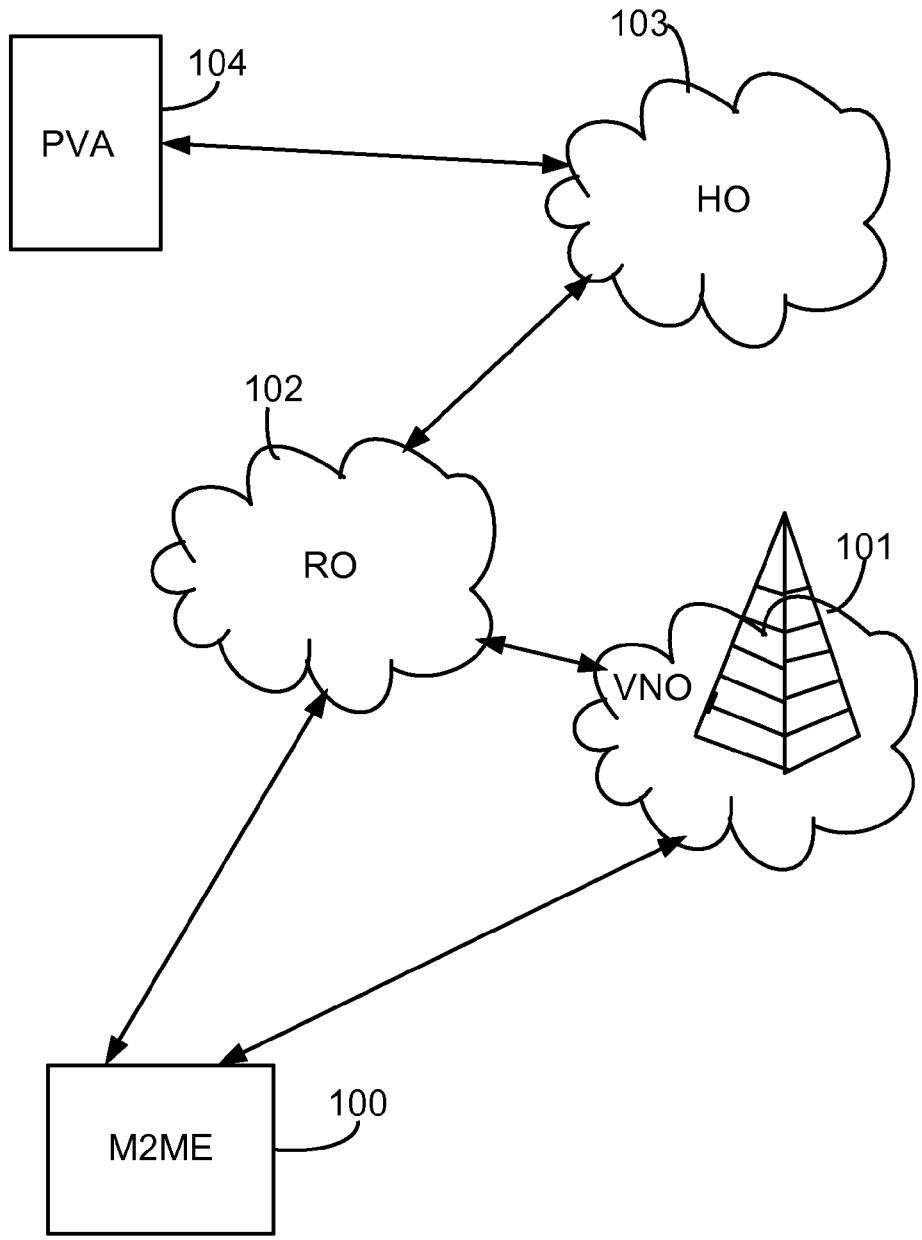
FIG. 1 is a system overview of a network solution which is capable of providing wireless access to M2MEs, according to the prior art.
Figure 2:
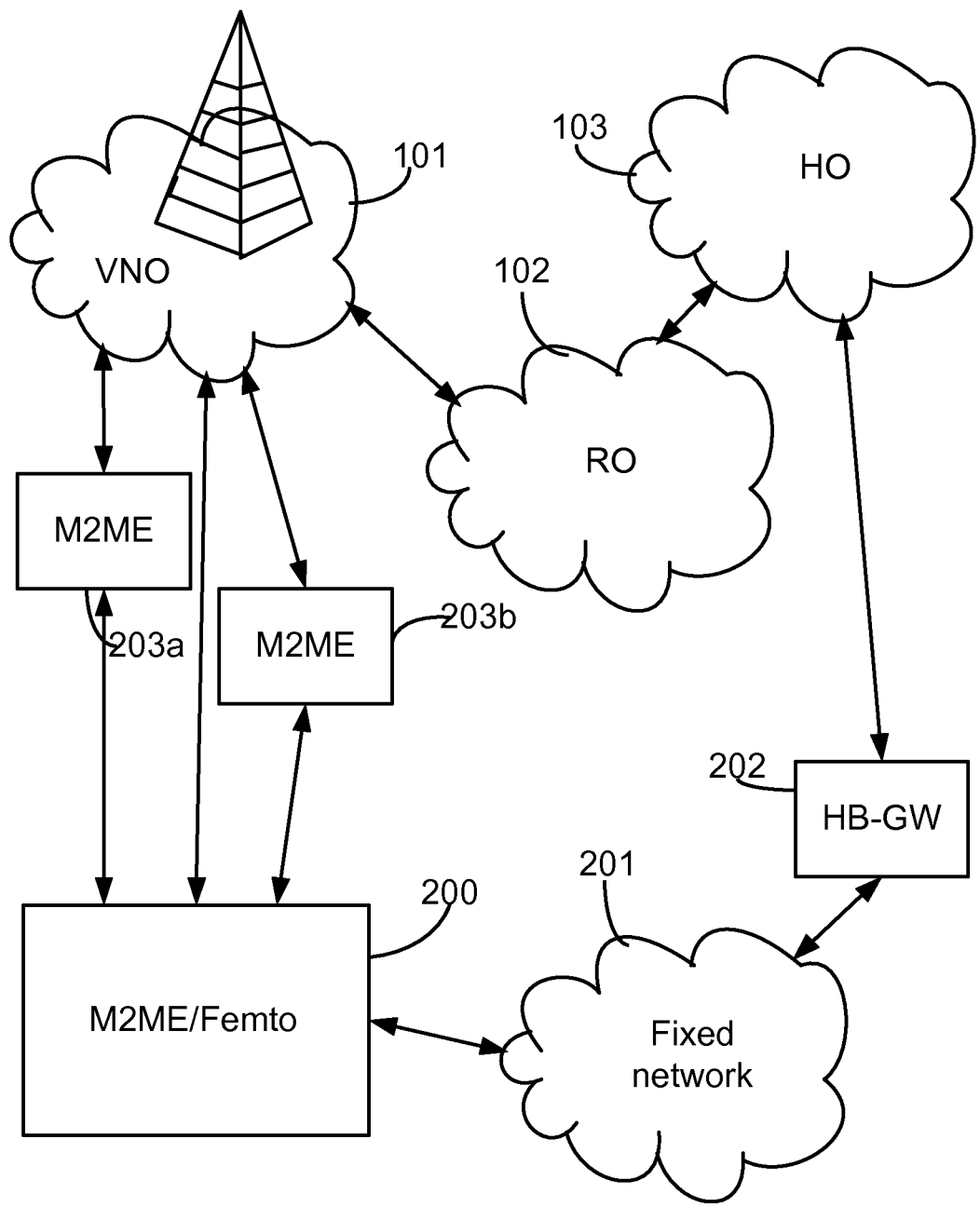
FIG. 2 is a system overview of another network solution which in addition to providing wireless access to M2MEs is capable of also providing alternative access possibilities to the M2MEs via extended M2MEs, comprising a combined M2ME/Femto functionality.

At least for the reasons set forth above an alternative, extended M2ME configuration, which from hereinafter will be referred to as a M2ME/Femto, is suggested. A simplified system architecture for supporting M2ME/Femto implementation is illustrated in FIG. 2. From hereinafter M2MEs are in this document to be regarded as devices having M2ME functionality, which are configured to connect to a wireless access network, typically via a VNO, as well as to a M2ME/Femto whenever connectivity via the VNO is not available.

The M2ME/Femto 200 of FIG. 2 comprises a mechanism which can be regarded as a fail-over mechanism which enables extended M2ME functionality of the M2ME/Femto to discover a connectivity disruption and to respond to such a situation by automatically instantiating a Femto functionality on the M2ME/Femto 200, resulting in that the M2ME/Femto 200, at least from a connectivity perspective, switches over from operating as a traditional M2ME to operating as a Femto cell, and establishes a fixed connectivity between the M2ME/Femto 200 and the HO 103 whenever it experiences a connectivity disruption with the VNO 101. The fixed connectivity may be base on any fixed technology which is suitable for connection set-up between a Femto cell and a home operator, including wireless fixed access, such as e.g. a microwave link.

Thereby, any M2ME 100*a*, 100*b*, which is not provided with such switching functionality but which is provided with information on the M2ME/Femto and which is also experiencing wireless connectivity disruption can resume connectivity via the alternative, access possibilities provided by the Femto cell of the M2ME/Femto by wirelessly accessing the Femto cell and connecting to the home operator via the alternative fixed connection provided by the M2ME/Femto.

More specifically, the M2ME/Femto 200 is configured as an arrangement which, in addition to comprising conventional M2ME functionality, also comprises functionality which is configured to activate a Femto cell, configured as a virtualized Femto cell. In order to achieve such an arrangement, an M2ME process, which initially provides for conventional M2ME functionality, is configured to initiate a Femto process, which provides Femto functionality, usable for providing an alternative access to a home operator.

Thereby, any M2ME which has been pre-configured to search for and connect to the M2ME/Femto 200 will be able to make use of the optional, alternative connectivity in case it is experiencing a disruption in the wireless connectivity.

The M2ME/Femto 200 may belong to a group together with one or more M2MEs, wherein each M2ME 100*a*,100*b* belonging to this group may be entitled to connect to the M2ME/Femto 200 in case of experiencing a connectivity disruption. Such a group can be pre-defined but may alternatively be created on an ad-hoc basis.

Femto cells are a type of low-power wireless access points which are configured to operate in a licensed spectrum for the purpose of connecting standard mobile UEs, such as e.g. laptops, cellular telephones or set-top boxes, to a mobile operator's network using a residential Digital Subscriber Line (DSL) or a cable broadband connection. As defined by 3GPP, a Femto cell may also be referred to as a Home Node B (HNB).

Figure 3:
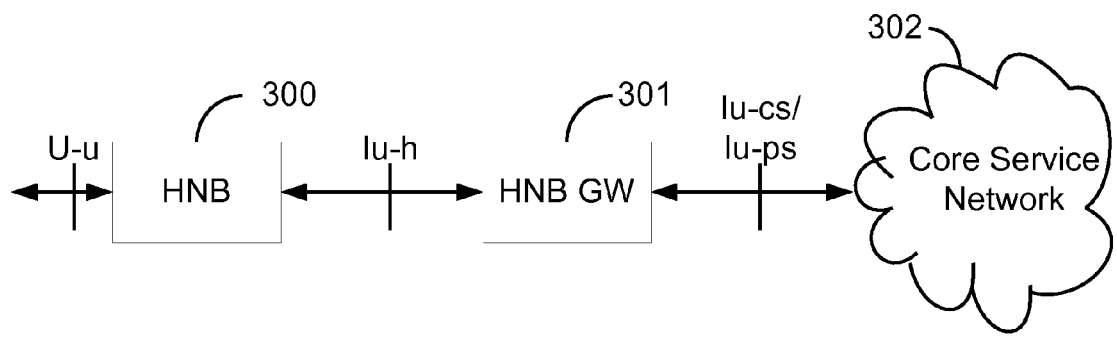
FIG. 3 is a simplified illustration of a network architecture for connecting a Home Node B to a core service network, according to the prior art.

FIG. 3 is a simplified network architecture illustrating an access network comprising a HNB 300, where HNB 300 is typically connected to a HNB Gateway (301; HNB GW) via a Iu-h interface, such that the HNB can access an existing residential broadband service (not shown) provided via a core service network 302. The IU-h interface provides for secure and scalable communication over the Internet. The Iu-h also defines an efficient and reliable method for transportation of Iu-based traffic, as well as a new control protocol, referred to as the Home Node B Application Part (HNBAP), which is configured to enable highly scalable ad-hoc HNB deployment. A HNB provides 3G radio coverage for 3G UEs, as well as other accessible devices, incorporating the capabilities both of a standard Node B and the radio resource management functions of a standard Radio Network Controller (RNC).

Although, FIG. 3 only shows one HNB, a HNB GW typically aggregates traffic from a large number of HNBs back into an existing core service network through the standard Iu-cs and Iu-ps interfaces. Although not shown in FIG. 3, a security gateway is typically also provided between the HNB and the HNB GW for enabling more secure data distribution.

As an alternative to configuring a device during manufacturing or during purchase, some or all functionality to be applied on the device may instead be implemented in a more flexible way by way of applying virtualization. When virtualization is applied a software related function, or a virtual machine, which is typically configured such that it can use shared hardware and/or software related resources, replaces a conventional hardware based device, and can thus, in addition to its flexibility, also provide for a more cost effective alternative.

Below two alternative virtualized computer architectures to be applied on a suitable device and which are well known in its technical field will now be described below with reference to FIGS. 4a and 4b, respectively.

Figure 4A:
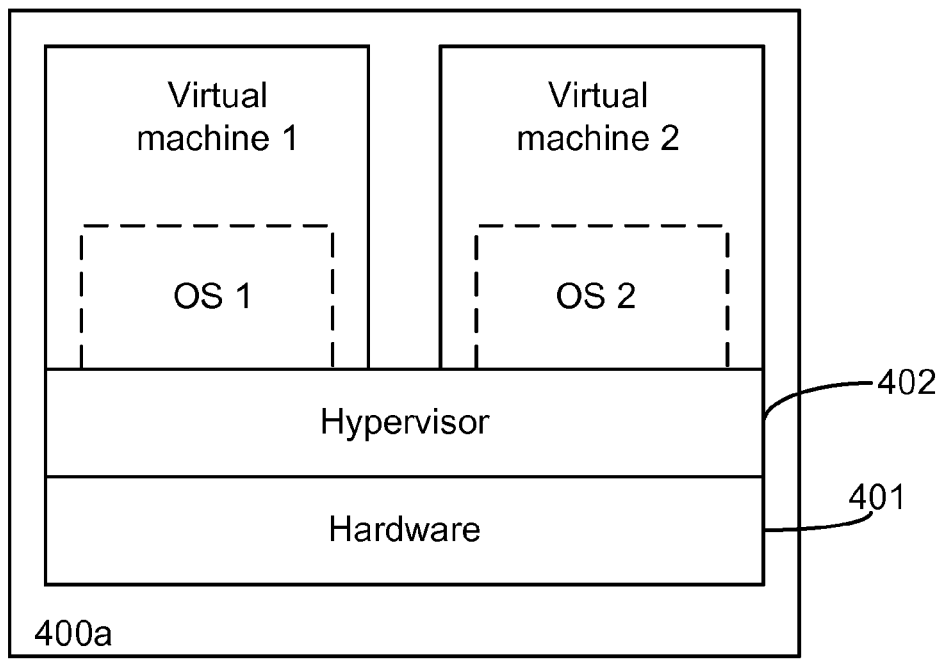
FIG. 4a is an illustration of a virtualized computer architecture according to the prior art.

FIG. 4a is a simplified illustration of a virtualized computer architecture 400a configured according to one embodiment. Instead of running one operating system on top of hardware 401, a hypervisor 402, which may also be referred to as a virtual machine monitor is configured such that it is able to run as a middleware between one or more operating systems (OS 1, OS 2) and the hardware. The hypervisor 402 has a purpose of acting as a hardware controller, for the purpose of managing resources which can be shared between two or more virtual machines, here referred to as Virtual Machine 1 and Virtual Machine 2, in which a respective operating system (OS 1, OS 2) can run. In the present case OS 1 is running in virtual machine 1, while OS 2 is running in virtual machine 2. More specifically, two main tasks for the hypervisor 402 are typically to enable instantiation of one or more virtual machines, to provision the shared hardware resources and to assure that the shared resources are shared between the different operating systems in a fair manner. Any operating system, such as e.g. be Windows OS, or Linux OS, such as e.g. Fedora, Ubuntu or Freebds, may be used in such a virtualized configuration.

Figure 4B:
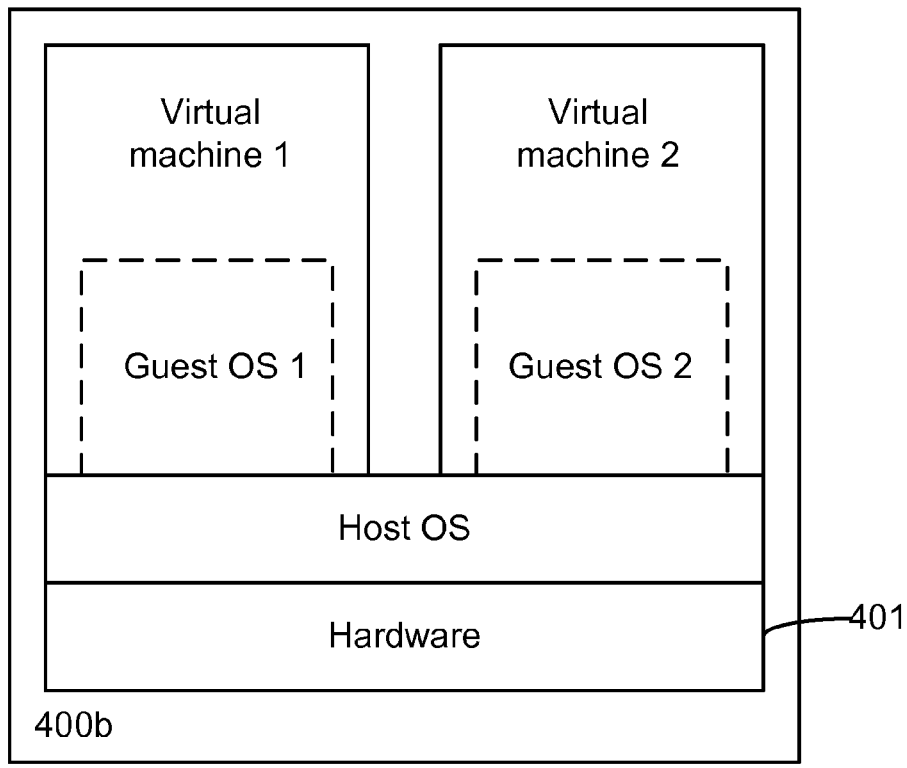
FIG. 4b is another illustration of an alternative virtualized computer architecture according to the prior art.

Another virtualized computer architecture 400b, according to another alternative embodiment is illustrated in FIG. 4b where a host operating system, here referred to as host OS, is running directly on the hardware 401 and where respective guest operating systems, here referred to as Guest OS 1 and Guest OS 2, respectively, are running within a respective virtual machine. The described computer architecture 400b is capable of executing the two virtual machines, virtual machine 1 and virtual machine 2.

For exemplification and further clarification purposes, a M2ME/Femto operable according to any of the concepts described above, as well as a method which can be executable on a M2ME/Femto will be described in further detail below with reference to FIG. 5a-5c. It is to be understood that the described M2ME/Femto typically form part of a device which can be restricted to performing the described switch over mechanism or which may also be capable of executing other tasks, such as e.g. measuring or monitoring processes.

Figure 5A:
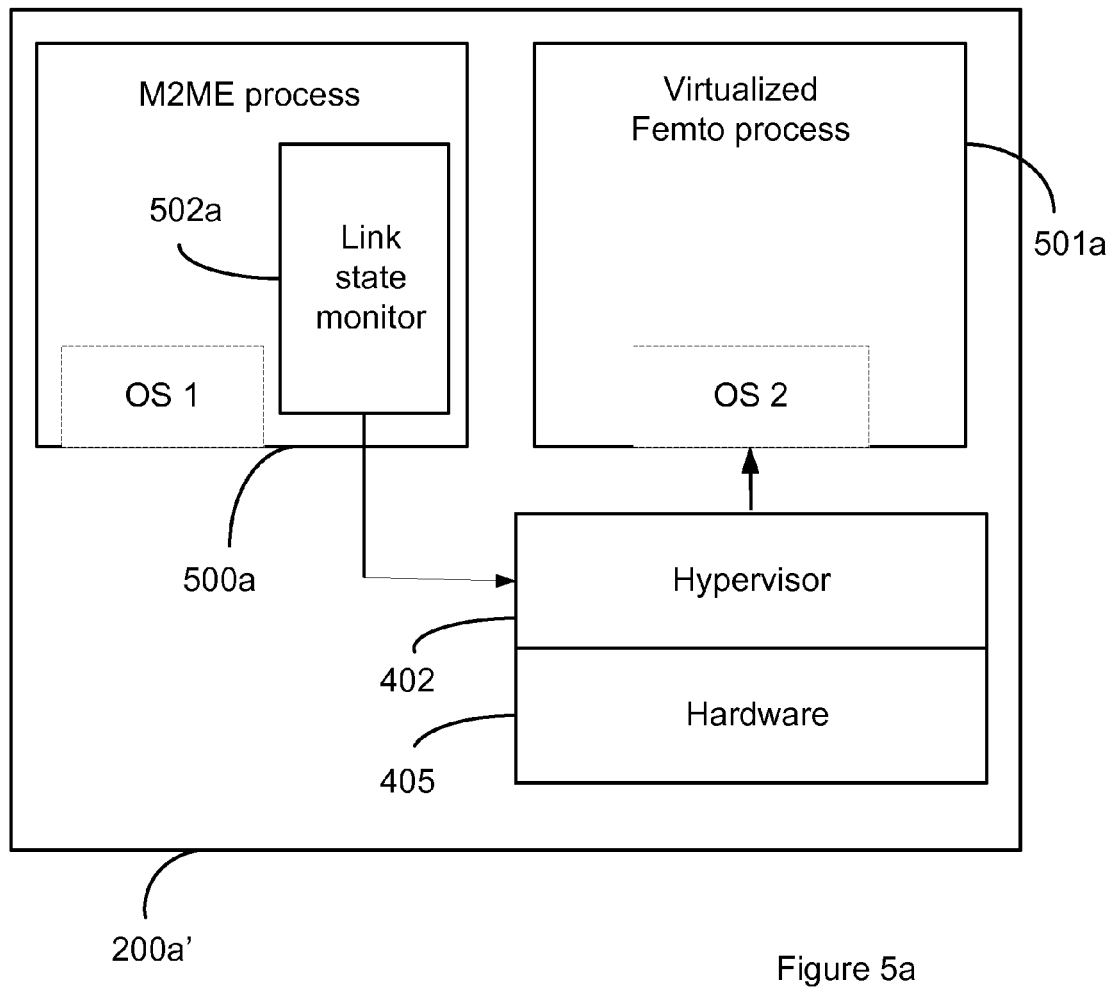
FIG. 5a is a block scheme of a M2ME/Femto according to one embodiment, where the M2ME/Femto is capable of executing a M2ME process and a virtualized Femto process.
Figure 5B:
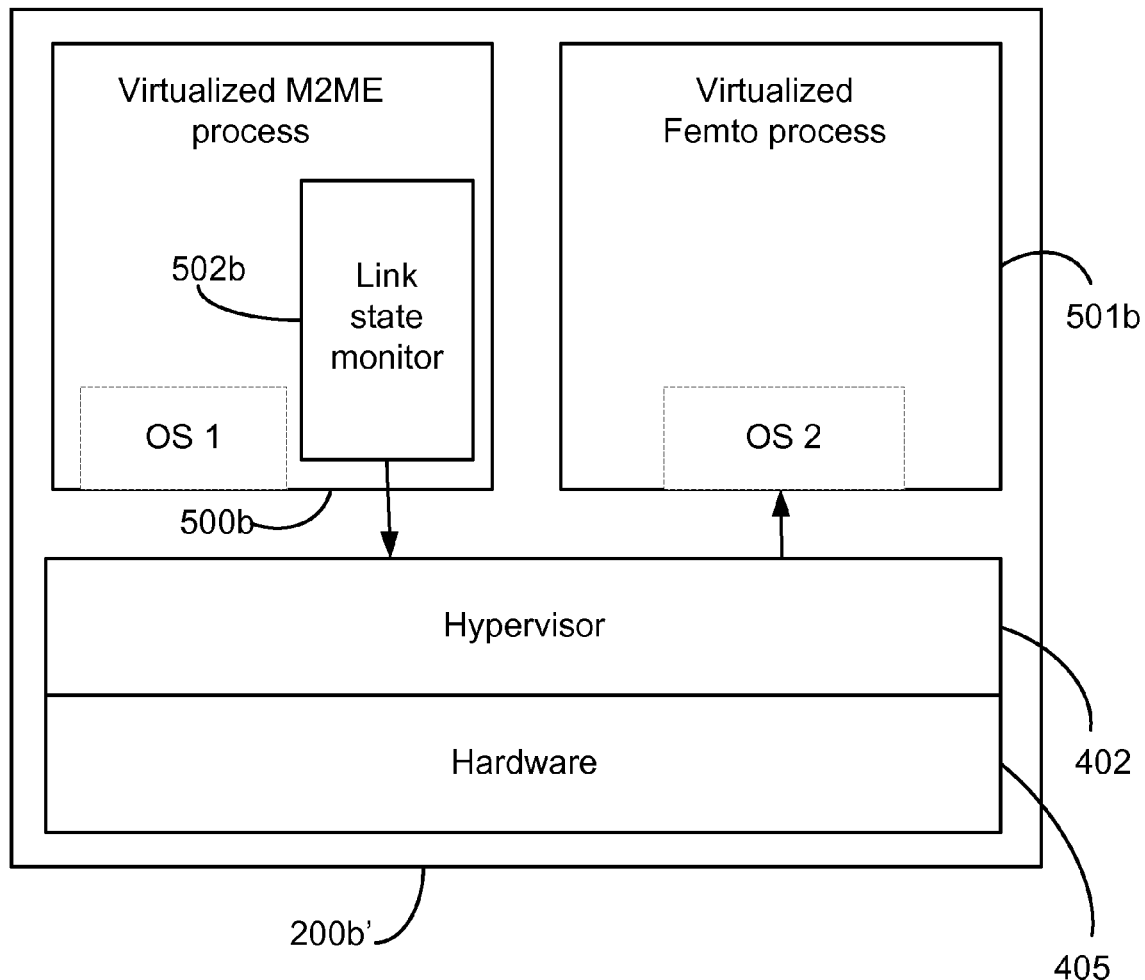
FIG. 5b is a logical block scheme of a M2M2E/Femto according to another embodiment, where the M2ME/Femto is configured to run an M2ME process and a Femto process where both processes are virtualized processes.

FIG. 5a is a simplified logical block scheme of a M2ME/Femto 200a' according to one embodiment which is configured to execute conventional M2ME tasks when a M2ME process 500a is being executed, or as a Femto cell, or more specifically as a virtualized Femto cell, when a virtualized Femto process 501a is also being executed on the M2ME/Femto 200a'. The M2ME process 500a is configured to execute, or realize, conventional M2ME functionality, including at least functionality for establishing wireless communication with a home operator, enabling the M2ME to subscribe to a network operator, according to M2ME procedures well known in the art.

The M2ME process 500a is provided with means, from hereinafter referred to as a link state monitor 502a, which is configured to monitor the state of the M2ME process 500a when the M2ME process provides connectivity to a home network via wireless access provided by a VNO, or any corresponding arrangement.

Upon detecting a connectivity disruption, which, depending on chosen configuration of the M2ME may be defined as anything from a total connectivity failure to a connection having a quality which, during the mentioned monitoring, does not reach a minimum quality level, the link state monitor 502a is further configured to instruct a hypervisor 402 to activate, or instantiate a virtualized Femto process 501a on the M2ME/Femto 200a', such that an alternative connectivity can be provided via a virtualized Femto cell realized by the virtualized Femto process.

The link state monitor 502a may be configured to recognize a connectivity disruption when the quality of a connection between the M2ME process 500a of the M2ME/Femto 200a' and the VNO is below a predefined threshold, or when it is determined that the connection is completely broken. More details on this issue can be found in the previously mentioned standard document 3GPP TR 33.812.

The described monitoring function may e.g. be configured such that heartbeats normally sent out at regular intervals from a home operator to which the extended M2ME is connected are monitored by the link state monitor 502a of the M2ME/Femto 200a', and such that when no heartbeats have been received for a certain amount of time, this is interpreted as a disruption in the connectivity. For this purpose, the M2ME process 501a may comprise an optional timer (not shown) which is started upon recognizing a disruption and terminated when connectivity is again resumed. The use of such a timer for the described purpose is well known to the person skilled in the art and is therefore out of the scope of this invention. For that reason this function will not be described further in this document.

Alternatively, a conventional initial cell reselection procedure, typically managed by the radio resource control (RCC), as specified in 3GPP TS 25.331, may be used as a data input by the link state monitor.

When cell re-selection is triggered in the RCC, typically after repeated failed attempts to re-establish wireless connectivity have been executed, the M2ME/Femto will go into Idle mode. The link state monitor may therefore be configured to trigger Femto cell initiation when recognizing that the M2ME/Femto has entered the Idle mode.

Once the virtualized Femto process has been instantiated, the link state monitor 502a is further configured to establish a fixed communication between the M2ME/Femto 200a' and the home operator, such that the Femto process of the M2ME/Femto 200a' can provide fixed access between the M2ME/Femto 200a' and the home operator.

According to an alternative embodiment, which is described with reference to FIG. 5b, another logical architecture of a M2ME/Femto 200b', where both the M2ME and the Femto cell functionalities are configured as respective virtualized machines, or processes namely a virtualized M2ME process and a virtualized Femto process. The virtualized M2ME process comprises a link state monitor 502b which corresponds to the link state monitor described above with reference to the first embodiment, but which in the present embodiment is configured to monitor the virtualized M2ME process. Correspondingly, the virtualized M2ME process 500b is configured to operate in a way which corresponds to the M2ME process described above.

Figure 5C:
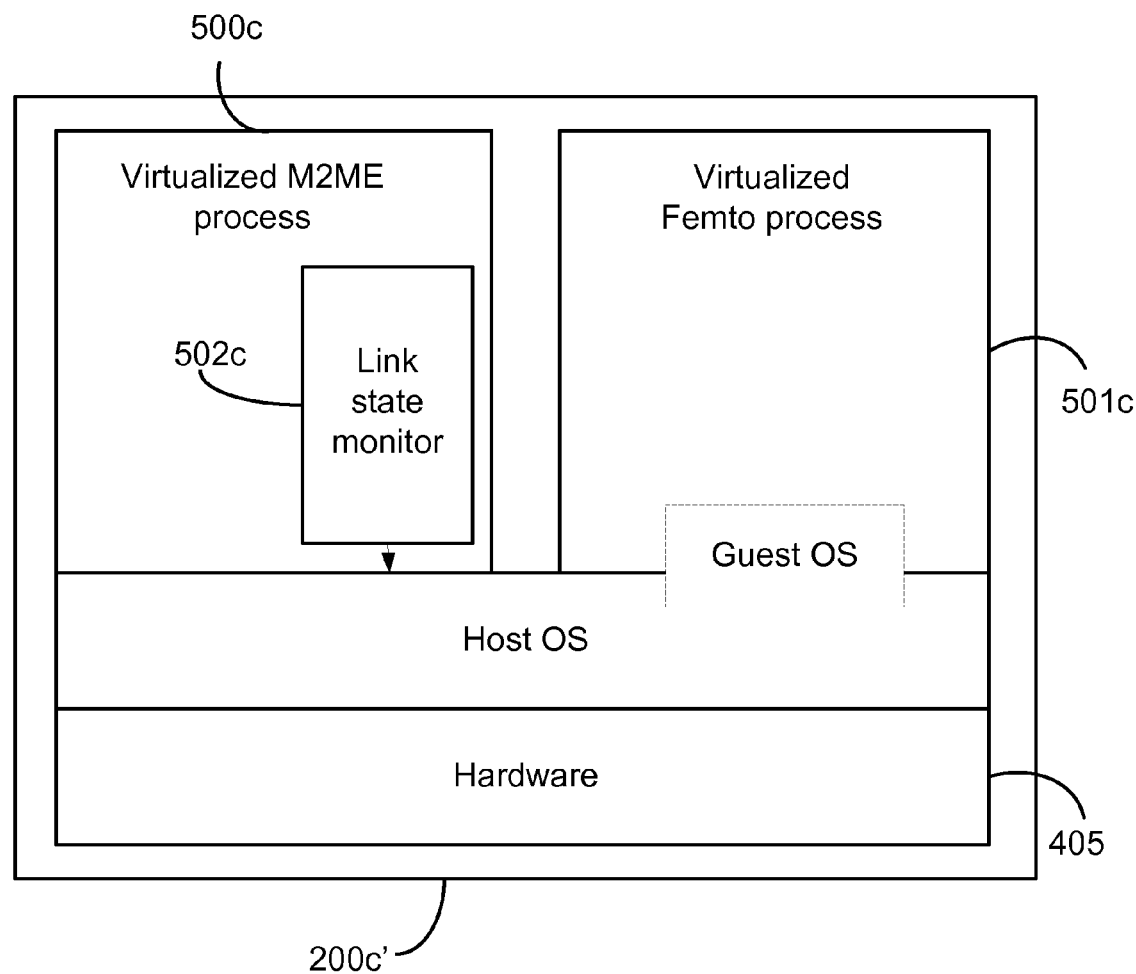
FIG. 5c is a logical block scheme of a M2M2/Femto according to yet another embodiment, where the M2ME/Femto is capable of executing a virtualized M2ME process and a virtualized Femto process applying a host and a guest operating system instead of a hypervisor.

FIG. 5c is an illustration of a logical M2ME/Femto 200c' according to yet another embodiment, where, instead of a hypervisor, a host operating system (host OS) is running directly on the hardware 405 of the M2ME/Femto 200c' acting as a host to a guest operating system (guest OS), which, after instantiation by a link state monitor 502c, is running in a virtualized Femto process 501c. The Link state monitor 502c is configured to act upon the virtualized Femto process, such that it can be instantiated and terminated, via the Host OS and Guest OS.

Typically, in any of the embodiments described above, the M2ME process is continuing to run, also after a switch over from an M2ME to a Femto cell has occurred, due to an instruction to switch over from M2ME functionality to Femto cell functionality being sent from the link state monitor 502a, 502b,502c to the hypervisor 402 or, if no hypervisor is applied, to the host OP and guest OS, and the link state monitor 502a,502b,502c is continuing to monitor the state of the M2ME process.

When the M2ME/Femto is operating as a Femto cell, the M2ME may continue to perform one or more tasks in parallel, such as e.g. performing sensor data collection.

Thereby, the link state monitor will be able to recognize when the wireless connectivity with a VHO is again acceptable or present, depending on the connectivity requirements set up for the M2ME/Femto. Upon recognizing such an event, the link state monitor 502a,502b,502c, is configured to instruct the hypervisor 402 or the Guest OS, via the host OS, to terminate the virtualized Femto process. With the M2ME process now once again experiencing wireless connectivity with a VNO and the Femto process being terminated, the M2ME/Femto continues to operate as a conventional M2ME.

In order to realize an operable M2ME/Femto, any of the logical architectures described above has to be realized such that the M2ME/Femto can communicate with a home operator via an alternative connection, and such that M2MEs can access the M2ME/Femto wirelessly, and make use of the alternative connection.

Figure 6:
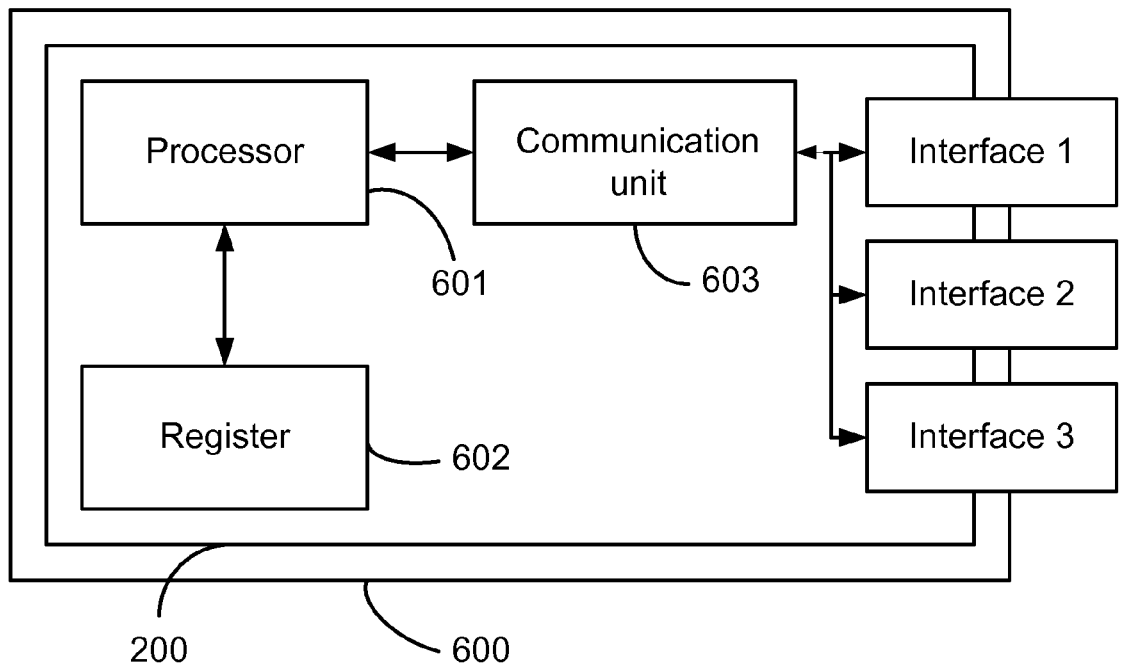
FIG. 6 is a physical block scheme illustrating a M2ME/Femto configured to provide an alternative access possibility to adjacent M2MEs.

FIG. 6 is a simplified illustration of a physical architecture of a M2ME/Femto 200. In the present embodiment the M2ME/Femto 200 is implemented on a device 600, which may comprise other functionality, such as e.g. sensing, measuring and/or monitoring means (not shown), interacting with the M2M2/Femto 200, but the M2ME/Femto 200 may also be configured as a standalone device.

The M2ME/Femto 200 comprises one or more processors, in the present embodiment exemplified with processor 601, which is configured to execute a M2ME process, which according to applied embodiments may be virtualized or not, and a virtualized Femto process, according to any of the embodiments described above. The M2ME/Femto 200 also comprises a storing means, in the present embodiment, here represented by register 602, which enables the processor 601 to access information on which one or more access points to search for when setting up a connection with a home operator. Unless stored in another storing means, especially adapted for such a purpose, register 602 may also have the function of maintaining an MCIM usable when setting up a connection with a home operator. The M2ME/Femto 200 also comprises a communication unit 603, operatively connected to the processor 601, and configured to communicate with a wireless access point via a first interface, interface 1, typically a standardized I-v interface. In addition, the communication unit 603 of the M2ME/Femto 200 is configured to communicate with a conventional M2ME via a second interface, interface 2, which may be e.g. a standardized l-w interface, thereby providing an alternative access point for the conventional M2ME, and with a fixed network via a third interface, interface 3, which may be e.g. a standardized Iu-h interface, when a Femto process is being executed. The third interface may be configured as a fixed interface or a dial-up interface, via which the M2ME process can set up a connection with a home operator in response to receiving a trigger, indicated wireless connectivity disruption from the link state monitor.

Once a virtualized Femto process is up and running, any conventional M2ME, i.e. M2MEs which does not comprise the described extended M2ME functionality, which also experience wireless connectivity disruption, may connect wirelessly to the Femto cell realized by the M2ME/Femto, such that the fixed connection can be utilised.

Figure 7:
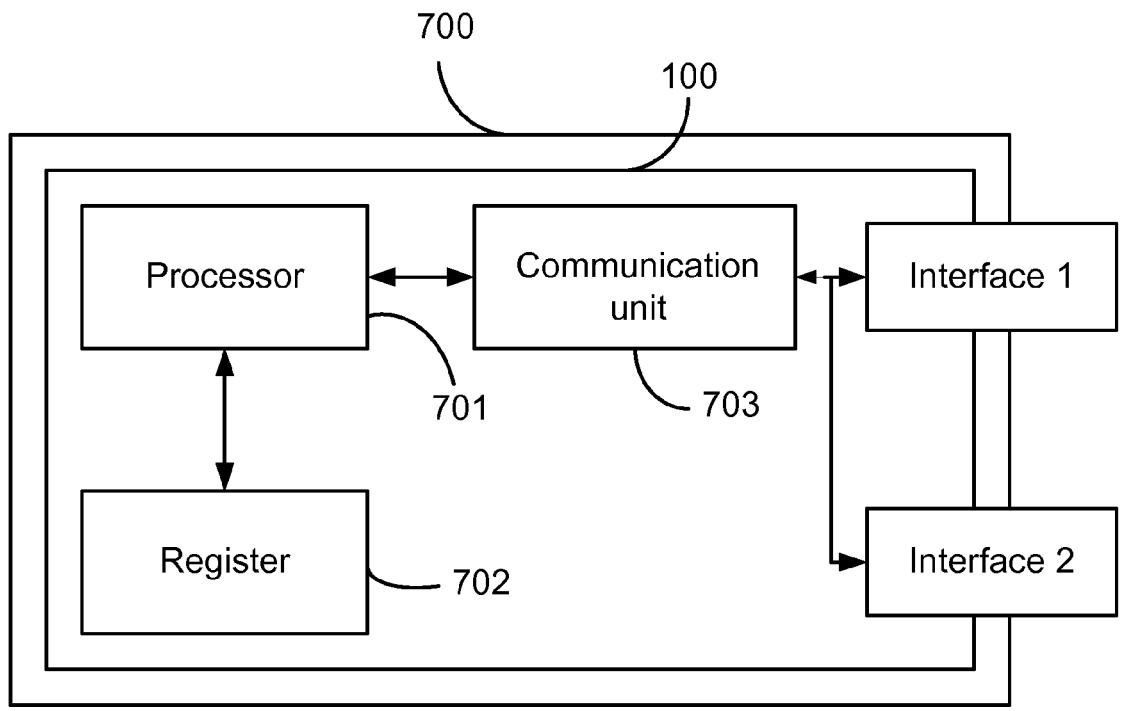
FIG. 7 is a physical block scheme illustrating a M2ME configured to connect to a home operator via a wireless access network or, in case of connectivity disruption, via an alternative access network accessible via a M2ME/Femto.

FIG. 7 is a simplified illustration of a physical architecture of such an M2ME according to one exemplifying embodiment.

A M2ME 100, which may form part of a device 700 or be configured as a standalone device, comprises a processor 701 configured to run a conventional M2ME process. In order for M2ME 100 to be able to connect to a M2ME/Femto it has to be provided with information allowing it to search for one or more M2ME/Femtos when the wireless connectivity is disrupted. This can be achieved by adding information associated with at least one M2ME/Femto to a register 702 which normally only comprises information associated with one or more conventional M2MEs. In addition, to being able to communicate via a first interface, interface 1, which enables the M2ME to access a home network via a VNO, a communication unit 703 of M2ME 100 is configured to communicate also via a second interface, interface 2, which may be e.g. a standardized I-w interface, enabling the M2ME to access a M2ME/Femto.

For a M2ME 100 to be able to subscribe to a home operator, a set-up or provisioning process has to be executed with the home operator 103.

Figure 8:
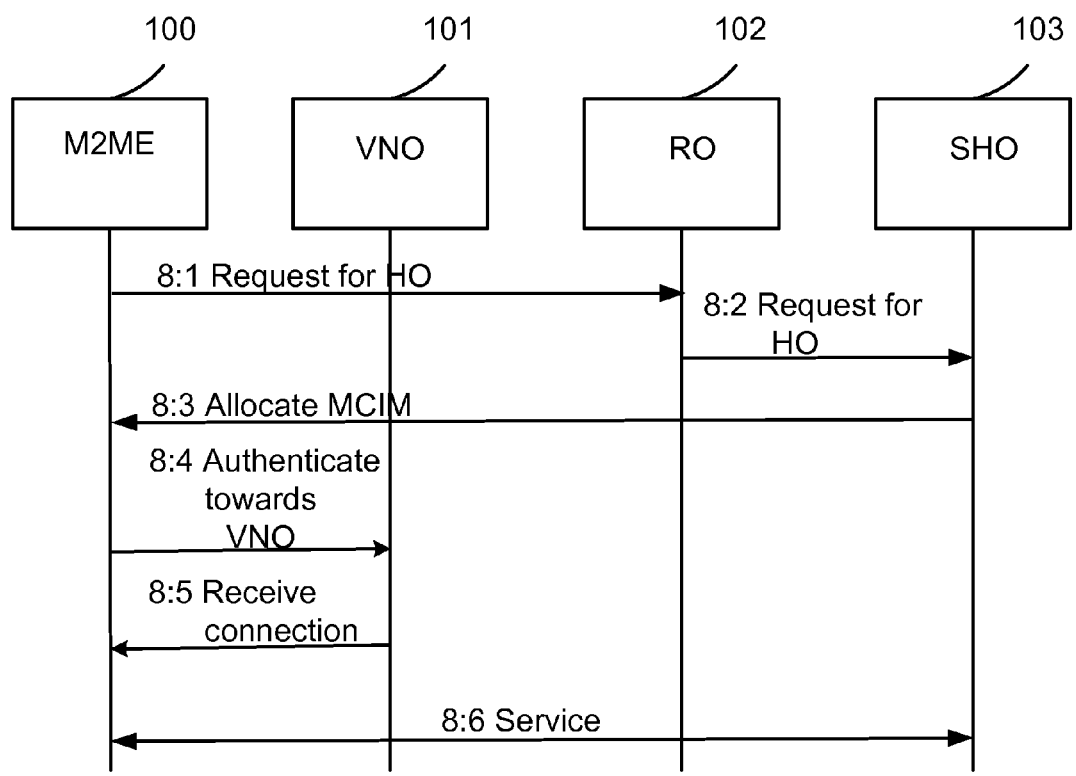
FIG. 8 is a signaling diagram illustrating a provisioning of an M2ME, according to the prior art.

FIG. 8 is a flow chart illustrating such a method for starting up a M2ME, which corresponds to the mechanism standardized for this purpose in TR 33.812. The described method may be applied both by a M2ME/Femto, which after execution of this process will operate as a M2ME, or more specifically by a M2ME process running on a M2ME/Femto, or, as indicated in the figure, by a conventional M2ME 100.

As a pre-requisite it is assumed that the M2ME 100 has searched for and accessed a VNO 101 which enables the M2ME 100 to access a home operator, in the present case represented by a HO 103 via a fixed connection.

In a first step 8:1, of FIG. 8, the M2ME 100 transmits a request for HO 103HO, to a RO 102 via the VNO 101, and in a subsequent step 8:2, RO 102 forwards the request to the HO 103. In addition to comprising information on the connection via the VNO, the request also comprises information on an alternative connection option via a M2ME/Femto, which is stored in a register of the M2ME 100. Alternatively, the register may comprise information on a plurality of M2ME/Femtos located within reach of the M2ME, such that, in case of connectivity disruption, the M2ME 100 can search for and request for a connection with any of these M2ME/Femtos. The HO 103 normally responds to the request by allocating an MCIM to the M2ME 100, as indicated in a subsequent step 8:3. In addition to comprising information on the present connection, the MCIM also comprise contact information on the one or more M2ME/Femtos addressed in the request, including a list of radio frequencies to use when checking if there is an access point available. Typically, the contact information also comprises security parameters, which enables a M2ME to authenticate once an access point, such as the VHO or a M2ME/Femto has been found.

Once in possession of an MCIM, the M2ME authenticates itself towards the VNO 103 in another step 8:4, and in a step 8:5, M2ME 100 receives a connection from the VNO 101, which enables the M2ME 100 to select and use a required service from the HO 103, as indicated in a final step 8:6.

Figure 9:
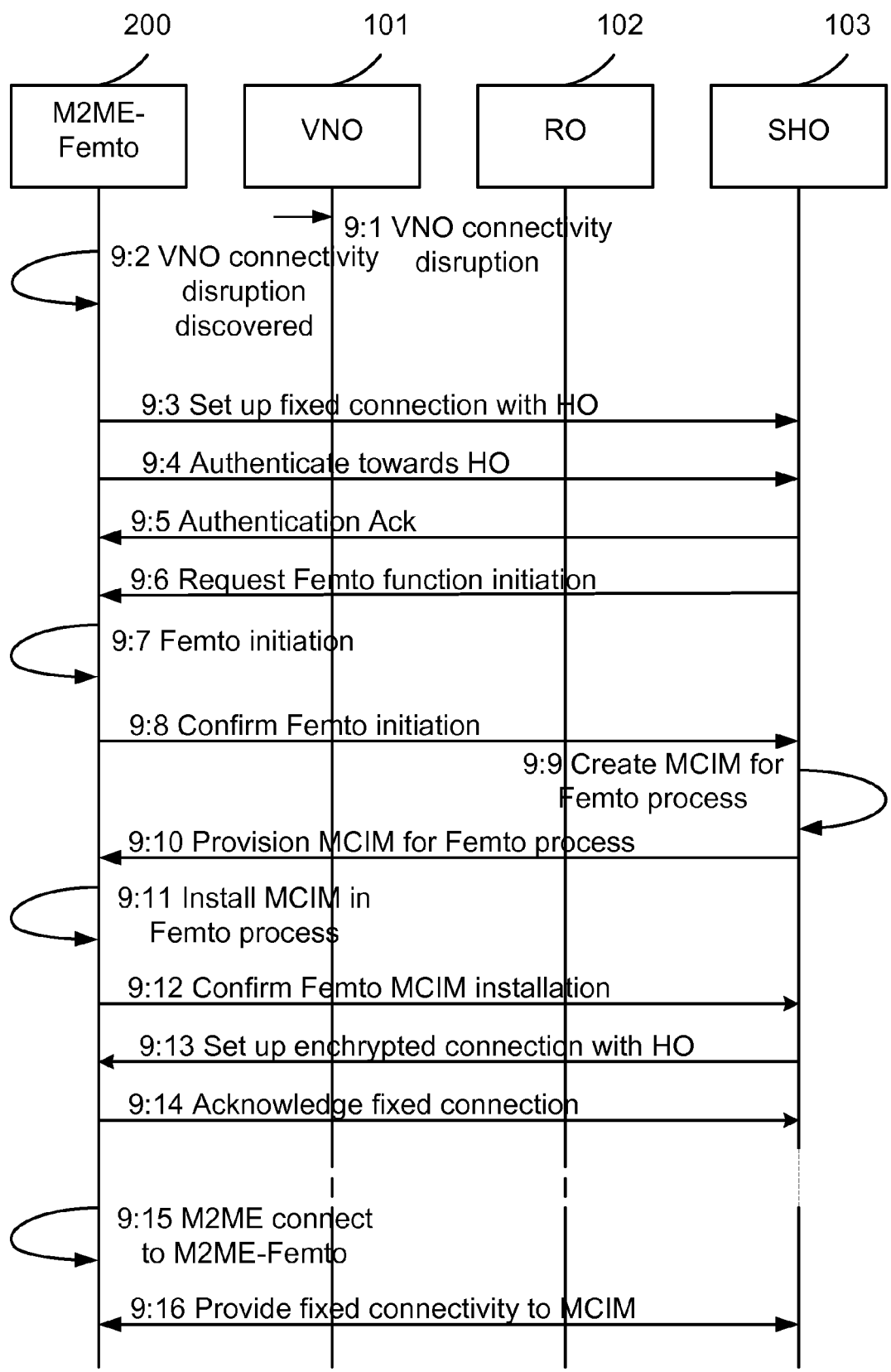
FIG. 9 is a signaling diagram illustrating a method at a M2ME/Femto of switching from M2ME functionality to Femto functionality due to a wireless connectivity disruption experienced by the M2ME functionality.

FIG. 9 is another signaling scheme illustrating a procedure at a M2ME/Femto 200 for switching from M2ME functionality to Femto cell functionality. As a pre-requisite, it is assumed that the M2ME/Femto 200 has earlier been provisioned by applying a procedure such as the one corresponding to the one described above with reference to FIG. 8.

In a first step 9:1 of FIG. 9, the VNO 101 to which M2ME/Femto 200 is connected is experiencing a connectivity disruption, which results in that the M2ME/Femto 200, operating as a M2ME, discovers the disruption, e.g. due to absence of heartbeats expected from the HO 103, or any other known monitoring function, as indicated in another step 9:2. In response to the discovery of the connectivity disruption, the M2ME/Femto 200 sets up a fixed connection with the HO 103, as indicated in another step 9:3, and authenticates towards the HO 103, as indicated in a subsequent step 9:4, previously using the MCIM, received during the initial M2ME instantiation, as authentication key. As indicated in following steps 9:5 and 9:6, respectively, HO 103 normally acknowledges the authentication and transmits a request for Femto cell initiation to M2ME/Femto 200.

Such a request may typically be triggered by the HO 103, recognizing that the connection set-up request of step 9:3 is received via a channel other than the one used for the disrupted wireless connection. Alternatively, or simultaneously, the HO 103 may receive an alert from a macro base station, indicating that it is being exposed to a connectivity disruption or failure. By recognizing a change of channel and/or an alert of a connectivity disruption or failure, the HO 103 will be able to determine that an alternative connection is required for a requesting M2ME/Femto.

If the M2ME/Femto has determined that an alternative connection set-up is required, the M2ME/Femto 200 responds to the request from the HO 103 by initiating and confirming the initiation of a Femto cell process, as indicted in steps 9:7 and 9:8, respectively.

As indicated in steps 9:9 and 9:10, HO responds by creating an MCIM which is valid for a Femto process and by provisioning the MCIM to the M2ME/Femto 200. In the subsequent steps 9:11 and 9:12, the M2ME/Femto 200 installs the MCIM, and confirms the installation to the HO 103. In response to the confirmation, the HO 103 sets up an encrypted connection, as indicated in step 9:13, and in a subsequent step 9:14, the connection is acknowledge by the M2ME/Femto 200.

From now on the M2ME/Femto 200 operates as a Femto cell, which from the perspective of at least some M2MEs will be considered as an alternative access point.

Step 9:15 indicates how a M2ME (not shown) connects to the M2ME/Femto 200, and the subsequent step 9:16 indicates how the M2ME/Femto 200 provide an alternative connectivity for the connected M2ME.

Figure 10:
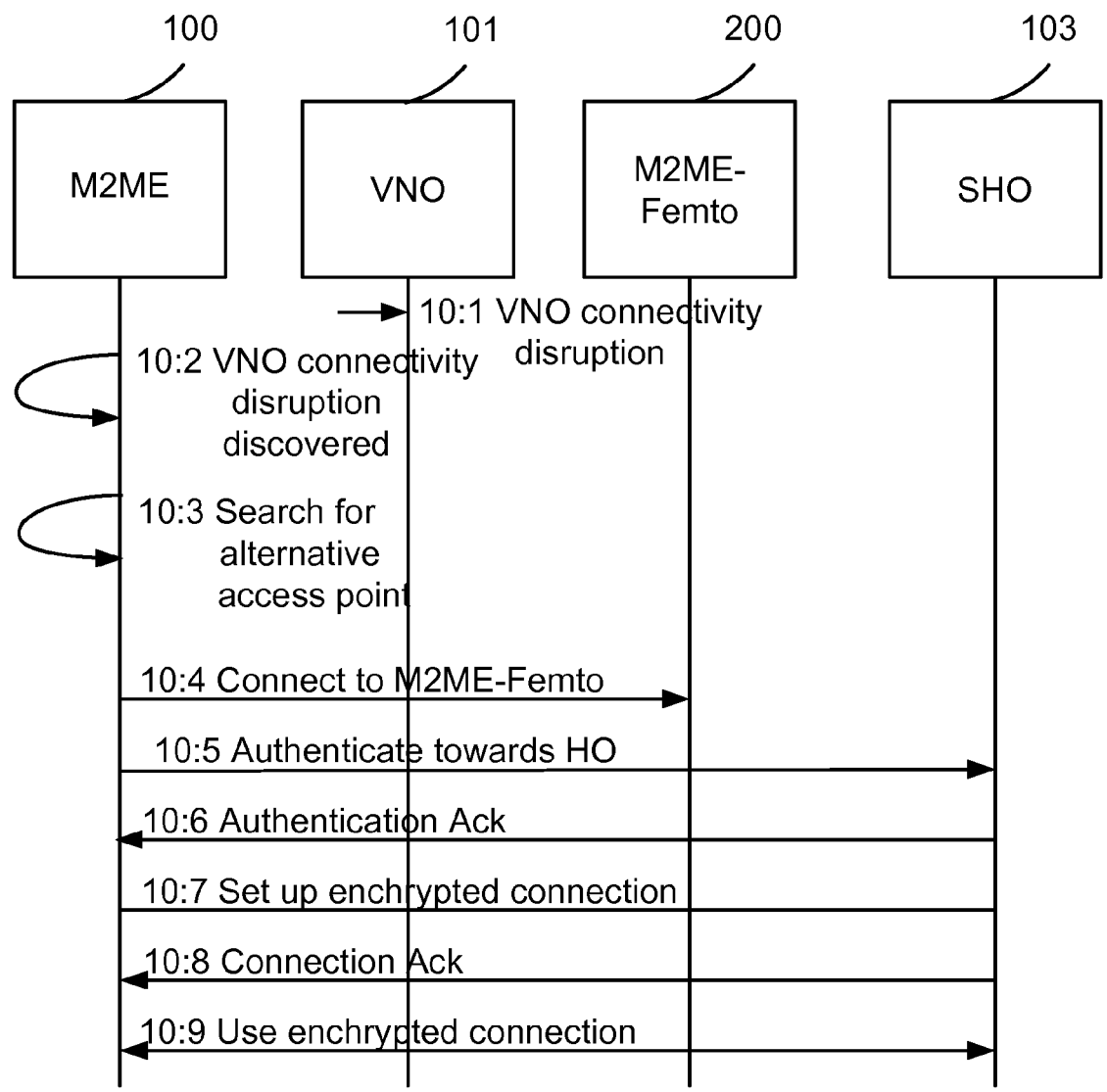
FIG. 10 is another signaling diagram, illustrating a method at a M2ME of establishing an alternative connection with a home network via a M2ME/Femto.

FIG. 10 is a more detailed signaling scheme of the process executed in steps 9:15 and 9:16 of FIG. 9, i.e. of a M2ME connecting to an M2ME/Femto.

In a first step 10:1 of FIG. 10 a connectivity disruption occurs in the VNO network, resulting in the discovery of a VNO connectivity disruption by the M2ME 100, e.g. due to the discovery of an absence of expected heartbeats from the HO, as indicated in step 10:2. If information on alternative access possibilities is available to the M2ME 100, it will be able to start search for such an alternative immediately upon recognizing the disruption. Such a process is indicated with a step 10:3. When the M2ME 100 has found a M2ME/Femto 200 it connects to it wirelessly as indicated in step 10:4, without having to involve the VNO 101. An authentication process is executed in steps 10:5 and 10:6, followed by the establishing of an encrypted connection, as indicated with steps 10:7 and 10:8, such that the M2ME 100 can resume the service provided by the HO 103 via the encrypted, alternative connection.

Figure 11:
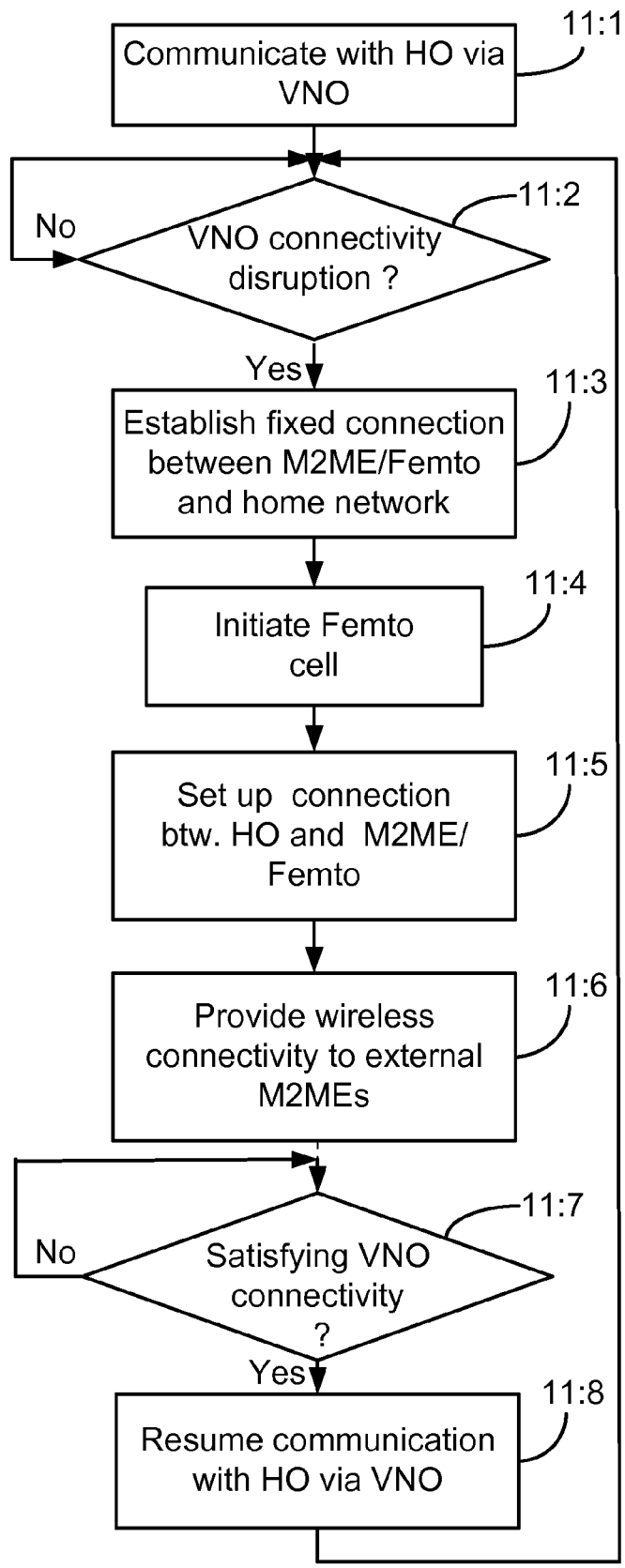
FIG. 11 is a flow chart illustrating a method for switching between M2ME and Femto functionality, executable at a M2ME/Femto.

FIG. 11 is a flow chart illustrating a method to be executed at a M2ME/Femto assuming that it is initially providing conventional M2ME functionality, as indicated in a first step 11:1. During communication, the M2ME/Femto is monitoring the VNO connectivity until in a next step 11:2, a VNO connectivity disruption is discovered by the M2ME/Femto, resulting in the establishing of a fixed connection between the M2ME/Femto and the home network, as indicated in a next step 11:3. In a subsequent step 11:4, the M2ME/Femto utilizes the fixed connection to initiate a Femto cell by instantiating a virtual Femto cell process. In a next step, 11:5, the M2ME/Femto sets up an encrypted connection between the HO, and the M2ME/Femto, thereby enabling for the Femto cell to access the HO, and for the Femto cell to act as an alternative access point for M2MEs which cannot access the HO via its ordinary wireless access, as indicated in another step 11:6.

As indicated in a subsequent step 11:7, the M2ME/Femto continues to monitor whether the VNO connectivity is satisfying or not, such that when it is again found to be satisfying, e.g. connectivity is once again resumed, or the quality of the connection is above a predefined threshold, the M2ME process of the M2ME/Femto terminates the Femto process and the M2ME/Femto resumes communication with the HO via a VNO, as indicated with a step 11:8.

Figure 12:
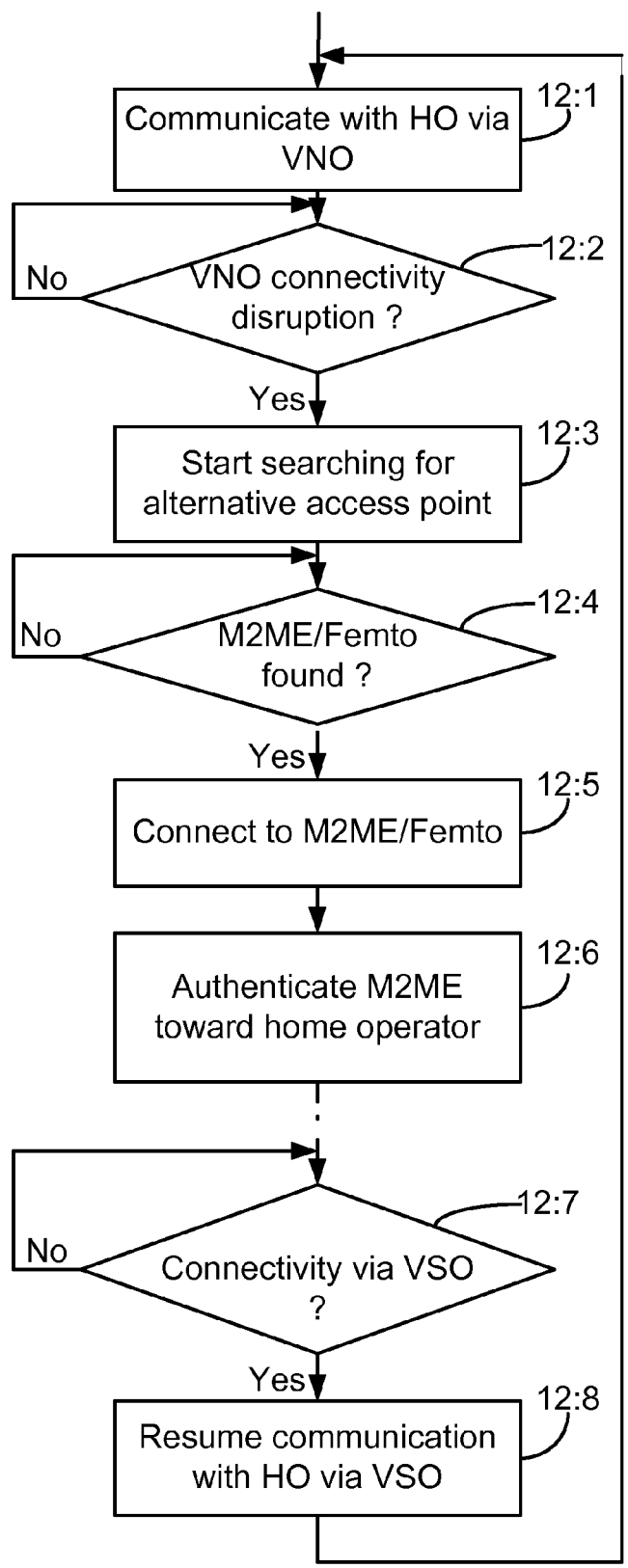
FIG. 12 is another flow chart illustrating a method for assuring connectivity via a conventional or an alternative access, executable at a M2ME.

FIG. 12 is another flow chart illustrating a method to be executed at a M2ME, such that the M2ME is able to resume connection with a HO, via an alternative fixed connection accessible via a Femto process running on a M2ME/Femto to which the M2ME have access, i.e. the M2ME have information on the M2ME/Femto stored in a register or any other storing means, which can be used for enabling access to the M2ME/Femto.

As indicated in a first step 12:1 the M2ME is initially communicating with a HO, via a VNO, until a VNO disruption is discovered by the M2ME according to known procedures, as indicated in a subsequent step 12:2. In another step 12:3, the M2ME commences by starting searching for an alternative access point, according to information available in a register, until a M2ME/Femto is found, as indicated in a subsequent step 12:4. In a next step 12:5 the M2ME connects to the M2ME/Femto, now operating as a Femto cell, and in a subsequent step 12:6, the M2ME authenticates towards the HO using an MCIM which was obtained when the M2ME was initially instantiated and which comprise information on the alternative access possibility provided via the M2ME/Femto.

As indicated in step 12:7, the M2ME communicating with the HO via the M2ME/Femto continues to monitor the connectivity provided via the VSO, such that when the connectivity is again available, the M2ME can resume communication with the HO via the VSO, as indicated in a next step 12:8 for as long as the connectivity is available.

In order for the HO, to be able to provision an MCIM for a Femto process, appropriate modifications will be required. Therefore, a network node of a HO which is configured to execute such a process will now be described with reference to FIG. 13.

Figure 13:
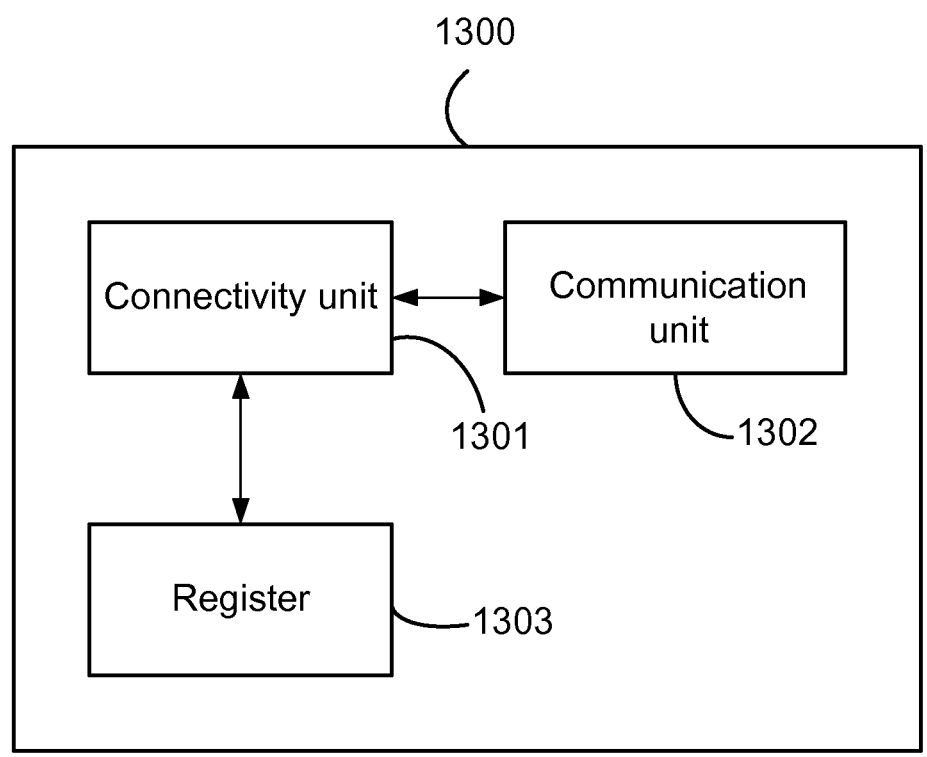
FIG. 13 is a simplified block scheme of a network node of a home operator which is configured to manage initiation of an M2ME and an M2ME/Femto.

FIG. 13 is a simplified block scheme of a network node 1300 of a home operator comprising a functional unit, here referred to as a connectivity unit 1301, which is capable of establishing a wireless connection between a M2ME and the home operator, according to standardized procedures. A register 1303 is provided e.g. for storing content of previously received MCIMs, which may indicate that an MCIM received in an authentication process is provided from a M2ME/Femto which has alternative access possibilities during connection set-up.

It is to be understood that a node of a home operator which is configured to communicate with M2ME's and M2ME/Femtos, such as the ones described in this document also comprise additional functionality, e.g. for generating MCIMs. For simplicity reasons however only functional entities which are relevant for the understanding of the mechanisms described in this document are described, while other functional entities not necessary have been omitted. The same applies for the other entities and functional units described in this document.

In addition, the connectivity unit 1301 is configured to set up a connection with a M2ME/Femto in response to receiving such a request from such an entity. The ability to distinguish between the different types of connections may be based on the frequency used in the request received from a M2ME or a M2ME/Femto, such that a frequency which differs from the frequency used earlier by the M2ME or the M2ME/Femto when connecting to the HO, acting as a M2ME indicates that an alternative connection is to be set up, i.e. that the network node 1300 shall respond to a connection set-up request by requesting the M2ME/Femto to instantiate a Femto process. The distinctions between frequencies can be obtained from a communication unit 1302 which is configured to provide communication functionality between the network node and the M2ME/Femto.

Alternatively, or in addition, the connectivity unit 1301 may be configured to recognize an alert provided from a macro base station, that it is in the process of connectivity disruption, such that, the reception of a subsequent request from the M2ME/Femto, the connectivity unit 1301 is configured to trigger the instantiation of a Femto process at the M2ME/Femto.

Figure 14:
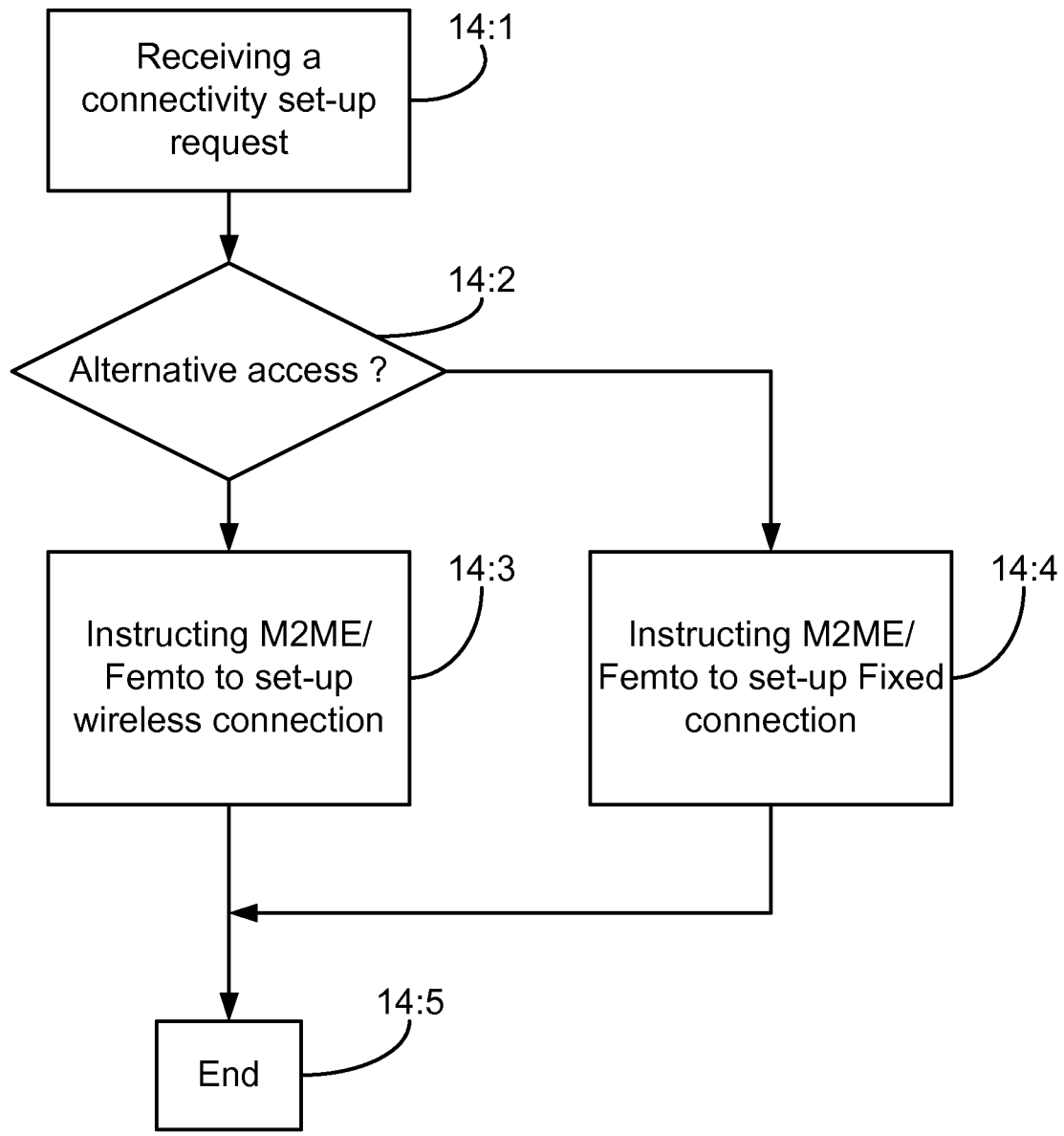
FIG. 14 is a flow chart illustrating a method to be performed by a node of a home operator having the purpose of managing a connection set-up between a M2ME/Femto and the node.

At the network node of the HO described above a method can be executed which enables a M2ME/Femto to provide for an alternative fixed connection to the HO according to one embodiment exemplified with FIG. 14.

In a first step 14:1 of FIG. 14, the network node receives a connection set-up request from a M2ME/Femto which has already established a wireless connection with the home operator. If, according to pre-defined conditions and as indicated in step 14:2, it can be determined by the network node that an alternative, fixed connection is required by the M2ME/Femto, the network node instructs the M2ME/Femto to initiate a process realizing a Femto cell and to set up a fixed connection between the first machine to machine equipment and the network node, as indicated in a next step 14:3.

According to one embodiment the network node may be configured to provide the described instruction to the M2ME/Femto on condition that it has received the connection set-up request from the M2ME/Femto via a channel, other than the channel used for establishing the wireless connection. The reception of a request on a channel other than the one used in the most recent preceding request may thereby be considered as an indication that the M2ME/Femto cannot use its previously used means of connection and, that it therefore requests for an alternative connection via an alternative channel.

According to an alternative embodiment, the network node may respond to a connection set-up request by transmitting the described instruction to the M2ME/Femto on condition that it has recognized that a group of machine to machine equipments is exposed to a connectivity disruption, and, upon receiving a request for connection set-up from a M2ME/Femto, that the M2ME/Femto belongs to the same group.

The different approaches for triggering the home operator to instruct the M2ME/Femto to initiate a Femto cell may be applied alone or in a combination.

ABBREVIATIONS

DPF Downloading and Provisioning Function
DRF Discovery and Registration Function
HNB Home Node-B
HNB GW HNB Gateway
HO Home Operator
IFC Initial Connectivity Function
M2ME Machine to Machine Equipment
PVA Platform Validation Authority
RO Registration Operator
SHO Selected Home Operator
VNO Virtual Network Operator

The invention claimed is:

1. A first machine to machine equipment comprising:
a processor operable to execute a first process which is capable of establishing wireless connection between the first machine to machine equipment and a home operator via a first wireless access point,
wherein said processor is further operable to execute a second process capable of realizing a virtualized Femto cell operable as an alternative wireless access point for a second machine to machine equipment to provide a connection between the second machine to machine equipment and the home operator via the first machine to machine equipment and a fixed connection, and
wherein the first process comprises a link state monitor capable of monitoring the wireless connectivity of said first process between the first machine to machine equipment and the home operator via the first wireless access point, and capable of initiating said second process to provide the fixed connection between said Femto cell and said home network responsive to recognizing a wireless connectivity disruption between the first machine to machine equipment and the home operator via the first wireless access point for said first process, and to provide the connection between the second machine to machine equipment and the home operator via the first machine to machine equipment and the fixed connection, wherein the fixed connection is provided without the wireless access point between the first machine to machine equipment and the home operator.

2. A first machine to machine equipment according to claim 1, wherein the processor providing the fixed connection includes authenticating towards said home operator, by providing to said home operator contact information about said Femto cell.

3. A first machine to machine equipment according to claim 2, wherein said processor is configured to provide said contact information to said home operator in a first machine communications identity module (MCIM).

4. A first machine to machine equipment according to claim 3, wherein said processor is further configured to install into the first machine to machine equipment a second MCIM dedicated for said second process wherein the second MCIM is received from said home operator.

5. A first machine to machine equipment according to claim 1, wherein said first process is configured to realize a virtualized machine to machine equipment.

6. A first machine to machine equipment according to claim 5, further comprising:
a hypervisor capable of running a first operating system in said first process and a second operating system in said second process.

7. A first machine to machine equipment according to claim 5, further comprising:
a first operating system capable of running in said first process, said first operating system being capable of acting as a host operating system to a second operating system capable of running in said second process.

8. A first machine to machine equipment according to claim 1, wherein the first process is configured to initiate said fixed connection via any of a fixed interface or a dial up interface.

9. A first machine to machine equipment according to claim 1, wherein said link state monitor is further capable of triggering a termination of said second process in case of monitoring a wireless connectivity via said first wireless access point which satisfies at least one predefined condition.

10. A second machine to machine equipment configured such that it is capable of connecting to a home network via a first interface and the first wireless access point (VNO), and of connecting, via a second interface to said home network via a first machine to machine equipment according to claim 1.

11. A first machine to machine equipment of claim 1 further comprising:
wherein the processor is configured to provide a connection between the second machine to machine equipment and the home operator via the first machine to machine equipment and the fixed connection using wireless communication between the first and second machine to machine equipments after initiating the second process.

12. A first machine to machine equipment of claim 11 wherein the first wireless access point comprises a mobile telecommunications wireless network, and wherein the fixed connection between the first machine to machine equipment and the home operation comprises a residential broadband service.

13. A method performed by a first machine to machine equipment the method comprising:
executing a first process at the first machine to machine equipment which has established a wireless connection between the first machine to machine equipment and a home operator via a first wireless access point;
monitoring connectivity provided by said first wireless access point between the first machine to machine equipment and the home operator;
recognizing during said monitoring a wireless connectivity disruption between the first machine to machine equipment and the home operator via the first wireless access point;
responsive to recognizing the wireless connectivity disruption, initiating establishment of a fixed connection between the first machine to machine equipment and said home operator, wherein the fixed connection is provided without the wireless access point between the first machine to machine equipment and the home operator; and
responsive to recognizing the wireless connectivity disruption, initiating a second process at the first machine to machine equipment realizing a virtualized Femto cell, said virtualized Femto cell being operable as an alternative wireless access point to provide a connection between a second machine to machine equipment and the home operator via the first machine to machine equipment and the fixed connection.

14. A method according to claim 13, wherein the initiating establishment of the fixed connection comprises:
authenticating towards said home operator, by providing to said home operator contact information about said Femto cell.

15. A method according to claim 14, wherein said contact information is provided to said home operator in a first machine communications identity module (MCIM).

16. A method according to claim 15, further comprising:
receiving from said home operator a second MCIM dedicated for said Femto cell, and
installing said second MCIM dedicated for said Femto cell on said first machine to machine equipment.

17. A method according to claim 13, wherein the initiating establishment of the fixed connection is executed via any of a fixed interface or a dial-up interface.

18. A method according to claim 13, wherein the initiating said second process comprises:
generating a Femto cell initiation instruction, and
instructing a hypervisor to initiate the second process according to said instruction.

19. A method according to claim 18 further comprising:
generating a Femto cell termination instruction, and
instructing said hypervisor to terminate said Femto cell in case of recognizing during said monitoring a wireless connectivity provided via said first wireless access point which is satisfying at least one predefined condition.

20. A method according to claim 13, wherein the initiating said second process comprises:
generating by said link state monitor a Femto cell initiation instruction, and
instructing a guest operating system to execute said instruction.

21. A method according to claim 20 further comprising:
generating a Femto cell termination instruction, and
instructing said guest operating system to terminate said Femto cell in case of recognizing during said monitoring that a wireless connectivity provided via said first wireless access point which is satisfying at least one predefined condition.

22. A method of claim 13 further comprising:
after initiating the second process, providing a connection between the second machine to machine equipment and the home operator via the first machine to machine equipment and the fixed connection using wireless communication between the first and second machine to machine equipments.

23. A method of claim 22 wherein the first wireless access point comprises a mobile telecommunications wireless network, and wherein the fixed connection between the first machine to machine equipment and the home operation comprises a residential broadband service.

24. A network node of a home operator comprising:
a connectivity unit configured to establish a wireless connection between a first machine to machine equipment and the home operator via a wireless access point, wherein the connectivity unit is further configured to instruct the first machine to machine equipment to initiate a process realizing a Femto cell and to set up a fixed connection between the network node and the first machine to machine equipment, such that a second machine to machine equipment can connect to the home operator via the Femto cell and the fixed connection, wherein the fixed connection is provided without the wireless access point between the first machine to machine equipment and the home operator.

25. A network node according to claim 24, wherein the connectivity unit is configured to instruct the first machine to machine equipment to initiate said process in response to receiving a connection set-up request from the first machine to machine equipment via a channel, other than the channel used for establishing the wireless connection.

26. A network node according to claim 25, wherein the connectivity unit is capable of recognizing a connectivity disruption via said wireless connection and to request the first machine to machine equipment to initiate a Femto process in case of recognizing such a connectivity disruption.

27. A network node according to claim 26, wherein the connectivity unit is capable of recognizing that a group of machine to machine equipments, comprising said first machine to machine equipment, is exposed to a connectivity disruption and configured to respond to said connection set-up request by transmitting said instruction to said first machine to machine equipment in response to recognizing such a connectivity disruption.

28. A network node according to claim 24, wherein the connectivity unit is configured to request said first machine to machine equipment to initiate a Femto process, which when executed on said first machine to machine equipment is capable of providing a second machine to machine equipment access to the home operator via said fixed connection, in response to receiving said set-up request from said first machine to machine equipment.

29. A network node of claim 24 wherein the first machine to machine equipment is configured to provide the connection between the second machine to machine equipment and the home operator via the first machine to machine equipment and the fixed connection using wireless communication between the first and second machine to machine equipments after initiating the process.

30. A network node of claim 29 wherein the wireless access point comprises a mobile telecommunications wireless network, and wherein the fixed connection between the first machine to machine equipment and the home operation comprises a residential broadband service.

31. A method performed by a network node of a home operator, the method comprising:
   establishing a wireless connection between a first machine to machine equipment and the home operator via a wireless access point; and
   instructing the first machine to machine equipment to initiate a process realizing a Femto cell and to set up a fixed connection between the first machine to machine equipment and the network node, thereby enabling a second machine to machine equipment to connect to the home operator via the Femto cell and the fixed connection, wherein the fixed connection is provided without the wireless access point between the first machine to machine equipment and the home operator.

32. A method according to claim 31, wherein said instruction is provided to the first machine to machine equipment in response to receiving a connection set-up request from the first machine to machine equipment via a channel, other than the channel used for establishing the wireless connection.

33. A method according to claim 32 wherein the instruction for the first machine to machine equipment to initiate a Femto process is transmitted in case of recognizing a connectivity disruption for said wireless connection.

34. A method according to claim 33, wherein the network node is responding to said connection set-up request by transmitting said instruction to said first machine to machine equipment in case it has recognized that a group of machine to machine equipments, including said second machine to machine equipment, is exposed to a connectivity disruption.

35. A method of claim 31 wherein the first machine to machine equipment is configured to provide the connection between the second machine to machine equipment and the home operator via the first machine to machine equipment and the fixed connection using wireless communication between the first and second machine to machine equipments after initiating the process.

36. A method of claim 35 wherein the wireless access point comprises a mobile telecommunications wireless network, and wherein the fixed connection between the first machine to machine equipment and the home operation comprises a residential broadband service.

* * * * *

UNITED STATES PATENT AND TRADEMARK OFFICE
CERTIFICATE OF CORRECTION

PATENT NO. : 8,971,872 B2  
APPLICATION NO. : 13/878775  
DATED : March 3, 2015  
INVENTOR(S) : Damola et al.

Page 1 of 2

It is certified that error appears in the above-identified patent and that said Letters Patent is hereby corrected as shown below:

ON THE TITLE PAGE

On Page 2, in Item (56), under "OTHER PUBLICATIONS", in Column 1, Line 12, delete "WG3_Iu/TSGR3_55/docs/R3-070297.zip]." and insert -- WG3_lu/TSGR3_55/docs/R3-070297.zip]. --, therefor.

On Page 2, in Item (56), under "OTHER PUBLICATIONS", in Column 2, Line 9, delete "Version:Issue" and insert -- Version: Issue --, therefor.

IN THE DRAWINGS

In Fig. 5C, Sheet 6 of 14, delete " 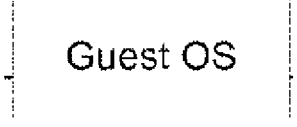 " and insert

-- 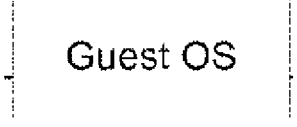 --, therefor.

In Fig. 10, Sheet 10 of 14, for Step "10:7", in Line 1, delete "enchrypted" and insert -- encrypted --, therefor.

In Fig. 10, Sheet 10 of 14, for Step "10:9", in Line 1, delete "enchrypted" and insert -- encrypted --, therefor.

IN THE SPECIFICATION

In Column 1, Line 52, delete "(IFC)" and insert -- (ICF) --, therefor.

Signed and Sealed this  
Twentieth Day of October, 2015

Michelle K. Lee  
*Director of the United States Patent and Trademark Office*

IN THE SPECIFICATION

In Column 3, Lines 14-15, delete "connectivity..................premises." and insert the same at Line 13, after "machine" as a continuation paragraph.

In Column 3, Line 44, delete "the..................provided." and insert the same at Line 43, after "and" as a continuation paragraph.

In Column 3, Lines 54-60, delete "conventional..................process." and insert the same at Line 53, after "a" as a continuation paragraph.

In Column 9, Line 24, delete "Freebds," and insert -- Freebsd, --, therefor.

In Column 9, Line 39, delete "FIG." and insert -- FIGS. --, therefor.

In Column 16, Line 4, delete "IFC" and insert -- ICF --, therefor.

IN THE CLAIMS

In Column 17, Line 12, in Claim 10, delete "point (VNO)," and insert -- point, --, therefor.

In Column 17, Line 30, in Claim 13, delete "equipment" and insert -- equipment, --, therefor.